(12) United States Patent
Takano et al.

(10) Patent No.: US 8,607,259 B2
(45) Date of Patent: Dec. 10, 2013

(54) DISK LAMINATE, DISK CARTRIDGE, DISK LOADING/UNLOADING MECHANISM, DISK CONVEYING DEVICE, DISK CONVEYING MECHANISM, AND THIN DISK DRIVING SYSTEM

(75) Inventors: Yoshimichi Takano, Tokyo (JP); Nobuaki Onagi, Kanagawa (JP); Kohji Tsukahara, Kanagawa (JP); Haruki Tokumaru, Tokyo (JP); Daiichi Koide, Tokyo (JP); Takeshi Kajiyama, Tokyo (JP); Masami Nishida, Saitama (JP)

(73) Assignees: Ricoh Company, Ltd., Tokyo (JP); Chotaro Engineering, Co., Sakado-shi (JP)

( * ) Notice: Subject to any disclaimer, the term of this patent is extended or adjusted under 35 U.S.C. 154(b) by 188 days.

(21) Appl. No.: 13/106,385

(22) Filed: May 12, 2011

(65) Prior Publication Data

US 2011/0283299 A1 Nov. 17, 2011

(30) Foreign Application Priority Data

May 14, 2010 (JP) ................. 2010-111604
May 14, 2010 (JP) ................. 2010-111608
May 14, 2010 (JP) ................. 2010-111621

(51) Int. Cl.
*G11B 17/04* (2006.01)
*G11B 23/03* (2006.01)

(52) U.S. Cl.
USPC ......... 720/714; 369/30.43; 720/615; 720/725

(58) Field of Classification Search
USPC ................. 101/40; 347/104; 369/30.4–30.49; 720/600, 601, 604, 605, 614–616, 652, 720/695, 700–717, 725
See application file for complete search history.

(56) References Cited

U.S. PATENT DOCUMENTS

| 6,222,800 | B1* | 4/2001 | Miller et al. ............... 369/30.19 |
| 6,337,842 | B1* | 1/2002 | Wolfer et al. .............. 369/30.57 |
| 7,789,442 | B2 | 9/2010 | Arai |
| 7,864,637 | B2 | 1/2011 | Yoshida et al. |
| 7,878,565 | B2 | 2/2011 | Arai |
| 2003/0231427 | A1 | 12/2003 | Nakamikawa |
| 2005/0201222 | A1* | 9/2005 | Awano et al. .............. 369/44.26 |
| 2008/0092152 | A1 | 4/2008 | Onagi |
| 2009/0185461 | A1 | 7/2009 | Kawakami |

FOREIGN PATENT DOCUMENTS

| JP | 4-283468 | 10/1992 |
| JP | 2004-22011 | 1/2004 |
| JP | 2006-79786 | 3/2006 |
| JP | 2006-92673 | 4/2006 |
| JP | 2006-92705 | 4/2006 |
| JP | 2007-12201 | 1/2007 |
| JP | 2007-287242 | 11/2007 |
| JP | 2007-310920 | 11/2007 |
| JP | 2007-310921 | 11/2007 |
| JP | 2007-310922 | 11/2007 |
| JP | 2008-97670 | 4/2008 |
| JP | 2009-163822 | 7/2009 |

(Continued)

*Primary Examiner* — Nathan Danielsen
(74) *Attorney, Agent, or Firm* — Oblon, Spivak, McClelland, Maier & Neustadt, L.L.P.

(57) ABSTRACT

A disk laminate includes thin disks laminated to each other, which are to be suctioned and conveyed; and spacers provided between the thin disks to prevent the thin disks from directly contacting each other, the spacers having air permeability.

7 Claims, 41 Drawing Sheets

(56) References Cited

FOREIGN PATENT DOCUMENTS

| JP | 2009-170049 | 7/2009 |
| JP | 2009-230783 | 10/2009 |
| JP | 2009-230785 | 10/2009 |
| JP | 2009-238258 | 10/2009 |

* cited by examiner

FIG.13

| SAMPLE NO. | WEIGHT PER UNIT AREA (g/m²) | THICKNESS (μm) | AIR PERMEABILITY (cc/cm²/SECOND) | SPACER LIFTED UP TOGETHER WITH THIN OPTICAL DISK |
|---|---|---|---|---|
| 1-1 | 60 | 200 | 20 | YES |
| 1-2 | 60 | 200 | 40 | YES |
| 1-3 | 60 | 200 | 80 | YES |
| 1-4 | 60 | 200 | 100 | NO ☆ |
| 1-5 | 60 | 200 | 150 | NO |
| 1-6 | 60 | 200 | 300 | NO |

☆ WHEN THE THIN OPTICAL DISK WAS VACUUM-SUCTIONED, THE SPACER IMMEDIATELY BELOW THE THIN OPTICAL DISK WAS LIFTED UP TOGETHER WITH THE THIN OPTICAL DISK, BUT THE SPACER FELL BY GRAVITY AFTER BEING HELD FOR ONE SECOND OR MORE.

FIG.15

| SAMPLE NO. | WEIGHT PER UNIT AREA (g/m²) | THICKNESS (μm) | AIR PERMEABILITY OF RING-SHAPED REGION (cc/cm²/SECOND) | THIN OPTICAL DISK LIFTED UP TOGETHER WITH SPACER |
|---|---|---|---|---|
| 2-1 | 30 | 160 | 0 | NO |
| 2-2 | 30 | 160 | 0.1 | NO |
| 2-3 | 30 | 160 | 0.5 | NO |
| 2-4 | 30 | 160 | 1 | NO ☆ |
| 2-5 | 30 | 160 | 10 | YES |
| 2-6 | 30 | 160 | 100 | YES |

☆ WHEN THE SPACER WAS VACUUM-SUCTIONED, THE THIN DISK IMMEDIATELY BELOW THE SPACER WAS LIFTED UP TOGETHER WITH THE SPACER, BUT THE THIN DISK FELL BY GRAVITY AFTER BEING HELD FOR ONE SECOND OR MORE.

FIG.40

| A (DRIVE UNIT) | | B (DRIVE UNIT) | |
|---|---|---|---|
| TRAY NO. | DISK | TRAY NO. | DISK |
| 1 | D1 | 2 | D2 |
| 3 | D3 | 4 | D4 |
| 5 | D5 | 6 | D6 |
| 7 | D7 | 8 | D8 |
| 9 | D9 | 10 | D10 |

FIG.41

| OPERATION | ARM ROTATION | D | C | B | A |
|---|---|---|---|---|---|
| 0 | (DISK TRAY : Open/ARM : TOPMOST POSITION) | | | | |
| 1 | (TRAY 1, 2 Open) | | | | |
| 2 | 0° | ↑D1 | | | |
| 3 | +90° | ↑S1 | D1 | | |
| 4 | +180° | ↑D2 | S1↓ | D1 | |
| 5 | +270° | ↑S2 | D2 | | D1↓ |
| 6 | +360° | | S2↓ | D2↓ | |
| 7 | (TRAY 1, 2 Close) | | | | |
| 8 | (TRAY 3, 4 Open) | | | | |
| 9 | (RETURN ARM) | | | | |
| 10 | (DOWN) | | | | |
| 11 | 0° | ↑D3 | | | |
| 12 | +90° | ↑S3 | D3 | | |
| 13 | +180° | ↑D4 | S3↓ | D3 | |
| 14 | +270° | ↑S4 | D4 | | D3↓ |
| 15 | +360° | | S4↓ | D4↓ | |
| 16 | (TRAY 3, 4 Close) | | | | |
| 17 | (TRAY 5, 6 Open) | | | | |
| 18 | (RETURN ARM) | | | | |
| 19 | (DOWN) | | | | |
| ⋮ | | | | | |
| 38 | 0° | ↑D9 | | | |
| 39 | +90° | ↑S9 | D9 | | |
| 40 | +180° | ↑D10 | S9↓ | D9 | |
| 41 | +270° | ↑S10 | D10 | | D9↓ |
| 42 | +360° | | S10↓ | D10↓ | |
| 43 | (TRAY 9, 10 Close) | | | | |
| 44 | (RETURN ARM) | | | | |
| 45 | 0° (LOWER ARM) | | | | |

FIG.42

| OPERATION | ROTATION ANGLE | POSITION | A / D | B / C | |
|---|---|---|---|---|---|
| 2 | | 0 | D1↑ | | |
| 3 | 90 | 90 | S1↑ | D1 | |
| 4 | 90 | 180 | D2↑ | D1 / S1↓ | |
| 5 | 90 | 270 | D1↓ / S2↑ | D2 | |
| 6 | 90 | 360 | | D2↓ / S2↓ | |
| 9 | -360 | 0 | D3↑ | | OPERATE TRAY ARM DOWN |
| 12 | 90 | 90 | S3↑ | D3 | |
| 13 | 90 | 180 | D4↑ | D3 / S3↓ | |
| 14 | 90 | 270 | D3↓ / S4↑ | D4 | |
| 15 | 90 | 360 | | D4↓ / S4↓ | |
| 18 | -360 | 0 | D5↑ | | OPERATE TRAY ARM DOWN |
| 21 | 90 | 90 | S5↑ | D5 | |
| 22 | 90 | 180 | D6↑ | D5 / S5↓ | |
| 23 | 90 | 270 | D5↓ / S6↑ | D6 | |
| 24 | 90 | 360 | | D6↓ / S6↓ | |
| 27 | -360 | 0 | D7↑ | | OPERATE TRAY ARM DOWN |
| 30 | 90 | 90 | S7↑ | D7 | |
| 31 | 90 | 180 | D8↑ | D7 / S7↓ | |
| 32 | 90 | 270 | D7↓ / S8↑ | D8 | |
| 33 | 90 | 360 | | D8↓ / S8↓ | |
| 36 | -360 | 0 | D9↑ | | OPERATE TRAY ARM DOWN |
| 39 | 90 | 90 | S9↑ | D9 | |
| 40 | 90 | 180 | D10↑ | D9 / S9↓ | |
| 41 | 90 | 270 | D9↓ / S10↑ | D10 | |
| 42 | 90 | 360 | | D10↓ / S10↓ | |

FIG.43

| OPERATION | ARM ROTATION | D ← | C ← | B ← | A ← |
|---|---|---|---|---|---|
| 0 | (DISK TRAY : Open HOLD/ARM : LOWERMOST POSITION) | | | | |
| 1 | 0° | | | | |
| 2 | (ARM ROTATION) | | | | |
| 3 | (TRAY 9, 10 Open) | | | | |
| 4 | +360° | | ↑S10 | ↑D10 | |
| 5 | +270° | S10↓ | D10 | | ↑D9 |
| 6 | +180° | D10↓ | ↑S9 | D9 | |
| 7 | +90° | S9↓ | D9 | | |
| 8 | 0° | D9↓ | | | |
| 9 | (TRAY 9, 10 Close) | | | | |
| 10 | (UP) | | | | |
| 11 | (ARM ROTATION) | | | | |
| 12 | (TRAY 7, 8 Open) | | | | |
| 13 | +360° | | ↑S8 | ↑D8 | |
| 14 | +270° | S8↓ | D8 | | ↑D7 |
| 15 | +180° | D8↓ | ↑S7 | D7 | |
| 16 | +90° | S7↓ | D7 | | |
| 17 | 0° | D7↓ | | | |
| 18 | (TRAY 7, 8 Close) | | | | |
| 19 | (UP) | | | | |
| ⋮ | | | | | |
| 38 | (ARM ROTATION) | | | | |
| 39 | (TRAY 1, 2 Open) | | | | |
| 40 | +360° | | ↑S2 | ↑D2 | |
| 41 | +270° | S2↓ | D2 | | ↑D1 |
| 42 | +180° | D2↓ | ↑S1 | D1 | |
| 43 | +90° | S1↓ | D1 | | |
| 44 | 0° | D1↓ | | | |
| 45 | (TRAY 1, 2 Close) | | | | |
| 46 | (DISKTRAY Close) | | | | |
| INITIAL | 0° (ELEVATE ARM) | | | | |

FIG.44

| OPERATION | ARM ROTATION | D | C | B | A |
|---|---|---|---|---|---|
| 0 | (DISK TRAY : Open/ARM : TOPMOST POSITION) | | | | |
| 1 | (TRAY 1, 2 Open) | | | | |
| 2 | 0° | ↑D1 | | | |
| 3 | -90° | | | | D1↓ |
| 4 | -270° | ↑S1 | | | |
| 5 | -180° | ↑D2 | S1↓ | | |
| 6 | -90° | ↑S2 | D2 | | |
| 7 | 0° | | S2↓ | D2↓ | |
| 8 | (TRAY 1, 2 Close) | | | | |
| 9 | (TRAY 3, 4 Open) | | | | |
| 10 | (DOWN) | | | | |
| 11 | 0° | ↑D3 | | | |
| 12 | -90° | | | | D3↓ |
| 13 | -270° | ↑S3 | | | |
| 14 | -180° | ↑D4 | S3↓ | | |
| 15 | -90° | ↑S4 | D4 | | |
| 16 | 0° | | S4↓ | D4↓ | |
| 17 | (TRAY 3, 4 Close) | | | | |
| 18 | (TRAY 5, 6 Open) | | | | |
| 19 | (DOWN) | | | | |
| ... | | | | | |
| 38 | 0° | ↑D9 | | | |
| 39 | -90° | | | | D9↓ |
| 40 | -270° | ↑S9 | | | |
| 41 | -180° | ↑D10 | S9↓ | | |
| 42 | -90° | ↑S10 | D10 | | |
| 43 | 0° | | S10↓ | D10↓ | |
| 44 | (TRAY 9, 10 Close) | | | | |
| 45 | 0° (LOWER ARM) | | | | |

FIG.45

| OPERATION | ARM ROTATION | D | C | B | A |
|---|---|---|---|---|---|
| 0 | (DISK TRAY : Open HOLD/ARM : LOWERMOST POSITION) | | | | |
| 1 | (TRAY 9, 10 Open) | | | | |
| 2 | 0° | | ↑S10 | ↑D10 | |
| 3 | −90° | S10↓ | D10 | | |
| 4 | −180° | D10↓ | ↑S9 | | |
| 5 | −270° | S9↓ | | | ↑D9 |
| 6 | −180° | D9↓ | | | |
| 7 | (TRAY 9, 10 Close) | | | | |
| 8 | (UP) | | | | |
| 9 | 0° | | | | |
| 10 | (TRAY 7, 8 Open) | | | | |
| 11 | 0° | | ↑S8 | ↑D8 | |
| 12 | −90° | S8↓ | D8 | | |
| 13 | −180° | D8↓ | ↑S7 | | |
| 14 | −270° | S7↓ | | | ↑D7 |
| 15 | −180° | D7↓ | | | |
| 16 | (TRAY 7, 8 Close) | | | | |
| 17 | (UP) | | | | |
| 18 | 0° | | | | |
| ⋮ | | | | | |
| 38 | (TRAY 1, 2 Open) | | | | |
| 39 | 0° | | ↑S2 | ↑D2 | |
| 40 | −90° | S2↓ | D2 | | |
| 41 | −180° | D2↓ | ↑S1 | | |
| 42 | −270° | S1↓ | | | ↑D1 |
| 43 | −180° | D1↓ | | | |
| 44 | (TRAY 1, 2 Close) | | | | |
| 45 | (DISKTRAY Close) | | | | |
| INITIAL | 0° (ELEVATE ARM) | | | | |

FIG.46

| OPERATION | ROTATION ANGLE | POSITION | A / D | B / C | |
|---|---|---|---|---|---|
| 1 | | 0 | D1↑ | | |
| 2 | 90 | 90 | S1↑ | D1 | |
| 3 | 90 | 180 | D2↑ | D1↓ S1↑ | |
| 4 | -90 | 90 | D2↓ S2↑ | | |
| 5 | 90 | 180 | D3↑ | S2↓ | OPERATE TRAY ARM DOWN |
| 6 | 90 | 270 | S3↑ | D3 | |
| 7 | 90 | 360 | D4↑ | D3↓ S3↑ | |
| 8 | -90 | 270 | D4↓ S4↑ | | |
| 9 | 90 | 360 | D5↑ | S4↓ | OPERATE TRAY ARM DOWN |
| 10 | 90 | 450 | S5↑ | D5 | |
| 11 | 90 | 540 | D6↑ | D5↓ S5↑ | |
| 12 | -90 | 450 | D6↓ S6↑ | | |
| 13 | 90 | 540 | D7↑ | S6↓ | OPERATE TRAY ARM DOWN |
| 14 | 90 | 630 | S7↑ | D7 | |
| 15 | 90 | 720 | D8↑ | D7↓ S7↓ | |
| 16 | -90 | 630 | D8↓ S8↑ | | |
| 17 | 90 | 720 | D9↑ | S8↓ | OPERATE TRAY ARM DOWN |
| 18 | 90 | 810 | S9↑ | D9 | |
| 19 | 90 | 900 | D10↑ | D9↓ S9↓ | |
| 20 | -90 | 810 (2+1/4) | D10↓ S10↑ | | |
| 21 | 90 | 900 | | S10↓ | |

FIG.47

| OPERATION | ROTATION ANGLE | POSITION | A / D | B / C | |
|---|---|---|---|---|---|
| 1 | | 90 | D1↑ | | |
| 2 | 90 | 180 | S1↑ | D1 | |
| 3 | 90 | 270 | D2↑ | D1↓ / S1↓ | |
| 4 | -90 | 180 | D2↓ / S2↑ | | |
| 5 | 90 | 270 | D3↑ | S2↓ | OPERATE TRAY ARM DOWN |
| 6 | -270 | 0 | S3↑ | D3 | |
| 7 | 90 | 90 | D4↑ | D3↓ / S3↓ | |
| 8 | -90 | 0 | D4↓ / S4↑ | | |
| 9 | 90 | 90 | D5↑ | S4↓ | OPERATE TRAY ARM DOWN |
| 10 | 90 | 180 | S5↑ | D5 | |
| 11 | 90 | 270 | D6↑ | D5↓ / S5↓ | |
| 12 | -90 | 180 | D6↓ / S6↑ | | |
| 13 | 90 | 270 | D7↑ | S6↓ | OPERATE TRAY ARM DOWN |
| 14 | -270 | 0 | S7↑ | D7 | |
| 15 | 90 | 90 | D8↑ | D7↓ / S7↓ | |
| 16 | -90 | 0 | D8↓ / S8↑ | | |
| 17 | 90 | 90 | D9↑ | S8↓ | OPERATE TRAY ARM DOWN |
| 18 | 90 | 180 | S9↑ | D9 | |
| 19 | 90 | 270 | D10↑ | D9↓ / S9↓ | |
| 20 | -90 | 180 | D10↓ / S10↑ | | |
| 21 | 90 | 270 | | S10↓ | |

FIG.48

| OPERATION | ROTATION ANGLE | POSITION | A / C | B / C | |
|---|---|---|---|---|---|
| 1 | | 0 | D1 ↑ | | |
| 2 | 90 | 90 | S1 ↑ | D1 | |
| 3 | 90 | 180 | D2 ↑ | D1 ↓ / S1 ↑ | |
| 4 | -90 | 90 | D2 ↓ / S2 ↑ | | |
| 5 | 90 | 180 | D3 ↑ | S2 ↓ | OPERATE TRAY ARM DOWN |
| 6 | 90 | 270 | S3 ↑ | D3 | |
| 7 | 90 | 360 | D4 ↑ | D3 ↓ / S3 ↑ | |
| 8 | -90 | 270 | D4 ↓ / S4 ↑ | | |
| 9 | 90 | 360 | | S4 ↓ | OPERATE TRAY ARM DOWN |
| 10 | -360 | 0 | D5 ↑ | | |
| 11 | 90 | 90 | S5 ↑ | D5 | |
| 12 | 90 | 180 | D6 ↑ | D5 ↓ / S5 ↓ | |
| 13 | -90 | 90 | D6 ↓ / S6 ↑ | | |
| 14 | 90 | 180 | D7 ↑ | S6 ↓ | OPERATE TRAY ARM DOWN |
| 15 | 90 | 270 | S7 ↑ | D7 | |
| 16 | 90 | 360 | D8 ↑ | D7 ↓ / S7 ↓ | |
| 17 | -90 | 270 | D8 ↓ / S8 ↑ | | |
| 18 | 90 | 360 | | S8 ↓ | OPERATE TRAY ARM DOWN |
| 19 | -180 | 180 | D9 ↑ | | |
| 20 | 90 | 270 | S9 ↑ | D9 | |
| 21 | 90 | 360 | D10 ↑ | D9 ↓ / S9 ↓ | |
| 22 | -90 | 270 | D10 ↓ / S10 ↑ | | |
| 23 | 90 | 360 | | S10 ↓ | |

FIG.49

| OPERATION | ROTATION ANGLE | POSITION | A / D | B / C | |
|---|---|---|---|---|---|
| 1 | | 0 | D1 ↑ | | |
| 2 | 90 | 90 | S1 ↑ | D1 | |
| 3 | 90 | 180 | D2 ↑ | D1 / S1 ↓ | |
| 4 | 90 | 270 | D1 ↓ / S2 ↑ | D2 | |
| 5 | 90 | 360 | D3 ↑ | D2 ↓ / S2 ↓ | |
| 6 | 90 | 450 | S3 ↑ | D3 | OPERATE TRAY ARM DOWN |
| 7 | 90 | 540 | D4 ↑ | D3 / S3 ↓ | |
| 8 | 90 | 630 | D3 ↓ / S4 ↑ | D4 | |
| 9 | 90 | 720 | D5 ↑ | D4 ↓ / S4 ↓ | |
| 10 | 90 | 810 | S5 ↑ | D5 | OPERATE TRAY ARM DOWN |
| 11 | 90 | 900 | D6 ↑ | D5 / S5 ↓ | |
| 12 | 90 | 990 | D5 ↓ / S6 ↑ | D6 | |
| 13 | 90 | 1080 | D7 ↑ | D6 ↓ / S6 ↓ | |
| 14 | 90 | 1170 | S7 ↑ | D7 | OPERATE TRAY ARM DOWN |
| 15 | 90 | 1260 | D8 ↑ | D7 / S7 ↓ | |
| 16 | 90 | 1350 | D7 ↓ / S8 ↑ | D8 | |
| 17 | 90 | 1440 | D9 ↑ | D8 ↓ / S8 ↓ | |
| 18 | 90 | 1530 | S9 ↑ | D9 | OPERATE TRAY ARM DOWN |
| 19 | 90 | 1620 | D10 ↑ | D9 / S9 ↓ | |
| 20 | 90 | 1710 | D9 ↓ / S10 ↑ | D10 | |
| 21 | 90 | 1800 (FIVE ROTATIONS) | | D10 ↓ / S10 ↓ | |

FIG.51

| OPERATION | ROTATION ANGLE | POSITION | A / D | B / C | |
|---|---|---|---|---|---|
| 1 | | 0 | D1↑ | | |
| 2 | 90 | 90 | S1↑ | D1 | |
| 3 | 90 | 180 | D2↑ | D1 / S1 | |
| 4 | -90 | 90 | D2↓ / S2↑ | | |
| 5 | 90 | 180 | | S2↓ | |
| 6 | -180 | 0 | D3↑ | | OPERATE TRAY ARM DOWN |
| 7 | 90 | 90 | S3↑ | D3 | |
| 8 | 90 | 180 | D4↑ | D3 / S3↓ | |
| 9 | -90 | 90 | D4↓ / S4↑ | | |
| 10 | 90 | 180 | | S4↓ | OPERATE TRAY ARM DOWN |
| 11 | -180 | 0 | D5↑ | | |
| 12 | 90 | 90 | S5↑ | D5 | |
| 13 | 90 | 180 | D6↑ | D5↓ / S5↓ | |
| 14 | -90 | 90 | D6↓ / S6↑ | | |
| 15 | 90 | 180 | | S6↓ | OPERATE TRAY ARM DOWN |
| 16 | -180 | 0 | D7↑ | | |
| 17 | 90 | 90 | S7↑ | D7 | |
| 18 | 90 | 180 | D8↑ | D7↓ / S7↓ | |
| 19 | -90 | 90 | D8↓ / S8↑ | | |
| 20 | 90 | 180 | | S8↓ | OPERATE TRAY ARM DOWN |
| 21 | -180 | 0 | D9↑ | | |
| 22 | 90 | 90 | S9↑ | D9 | |
| 23 | 90 | 180 | D10↑ | D9↓ / S9↓ | |
| 24 | -90 | 90 | D10↓ / S10↑ | | |
| 25 | 90 | 180 | | S10↓ | |

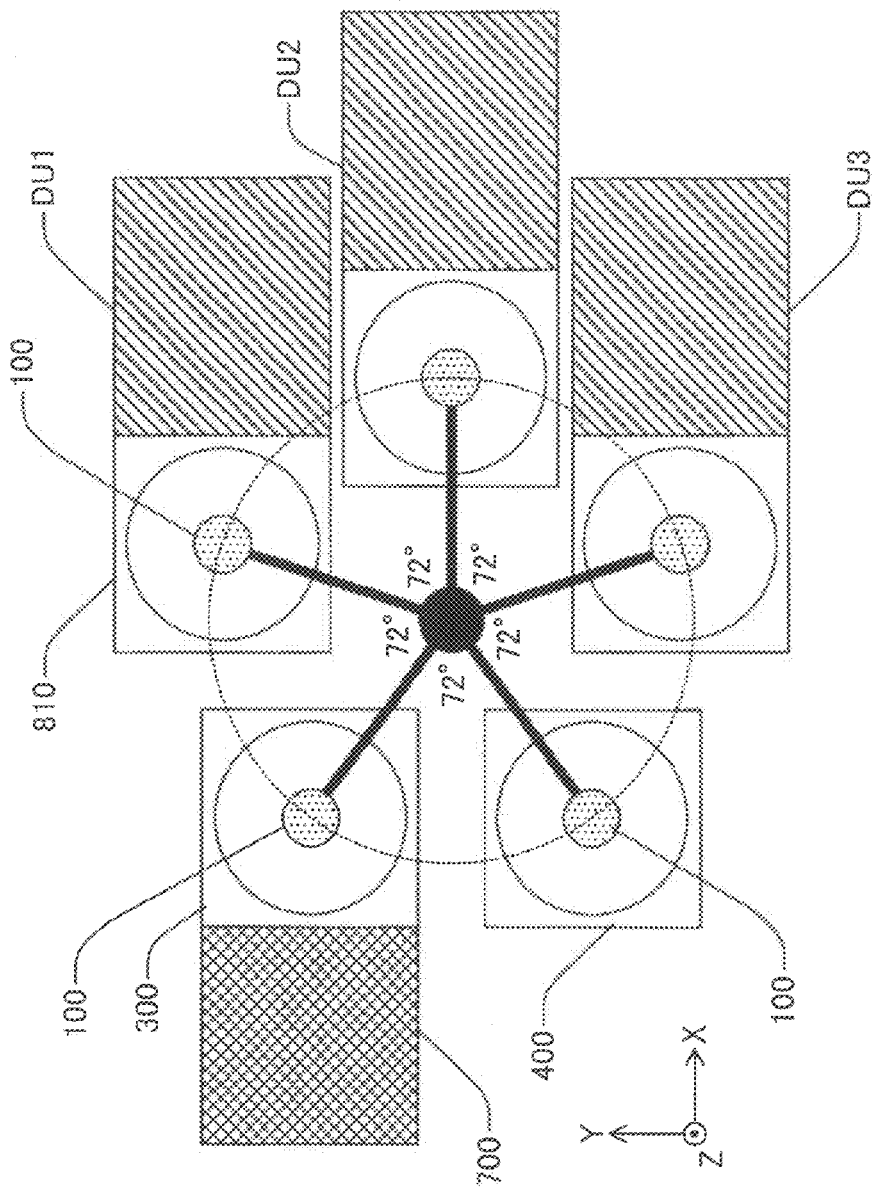

DISK LAMINATE, DISK CARTRIDGE, DISK LOADING/UNLOADING MECHANISM, DISK CONVEYING DEVICE, DISK CONVEYING MECHANISM, AND THIN DISK DRIVING SYSTEM

BACKGROUND OF THE INVENTION

1. Field of the Invention

The present invention relates to a disk laminate and a disk cartridge, and more particularly to a disk laminate in which plural thin disks are laminated and a disk cartridge in which the disk laminate is stored. Furthermore, the present invention relates to a disk loading/unloading mechanism and a disk conveying device, and more particularly to a disk loading/unloading mechanism for loading/unloading thin disks into and from a disk cartridge, and a disk conveying device including the disk loading/unloading mechanism. Furthermore, the present invention relates to a disk conveying mechanism and a thin disk driving system, and more particularly to a disk conveying mechanism for conveying thin disks and a thin disk driving system including the disk conveying mechanism.

2. Description of the Related Art

In recent years and continuing, as computers are handling increasingly high-volume information, there is growing demand for storage devices having larger capacity for storing high-volume information. Examples of storage devices are primarily hard disks, disk-type storage media such as optical disks, and tape-type storage media such as magnetic tape.

The total area of the recording region of a disk-type storage medium is smaller than that of a tape-type storage medium. Thus, if the recording density is the same, it is difficult to make the recording capacity per disk cartridge larger than that of the recording capacity per tape cartridge.

Accordingly, there have been proposals of storing multiple disks in a disk cartridge.

For example, patent document 1 discloses a magnetic disk cartridge that stores plural magnetic disk media in a housing.

Furthermore, patent document 2 discloses a recording disk cartridge in which plural flexible recording disk media are stored in a cartridge case so as to be integrally rotatable.

Furthermore, patent document 3 discloses a disk cartridge that stores multiple optical disks, and an optical disk recording/reproducing device that unloads an optical disk from the disk cartridge, performs recording/reproducing, and then returns the optical disk to the disk cartridge.

However, with the disk cartridges disclosed in patent documents 1 and 2 and the disk cartridge of the optical disk recording/reproducing device disclosed in patent document 3, the recording capacity per disk cartridge cannot be significantly increased.

Another means proposed for solving the above-described problem is to use optical disks having a thickness of approximately 0.1 mm through 0.3 mm (hereinafter, also referred to as "thin optical disks"). Multiple thin optical disks are stored in a single disk cartridge, so that the recording capacity is increased.

For example, patent document 4 discloses a cartridge for information recording media having the following features. Plural thin information recording media and one or more partition plates are laminated and stored in an unfixed state (the media and plates are not fixed to each other). At the edge portion of each partition plate, there is formed a unique tab corresponding to the storage position. By accessing the tabs, it is possible to access the partition plates at the respective storage positions.

Furthermore, patent document 1 discloses an optical disk recording/reproducing device for unloading an optical disk from a cartridge storing multiple sheet-type optical disks and for recording or reproducing data, and a disk autochanger for conveying the cartridge to a plurality of these optical disk recording/reproducing devices, unloading optical disks, and recording/reproducing data.

Furthermore, patent document 5 discloses a recording/reproducing device for recording or reproducing information of plural optical disks, which includes laminated trays in which plural optical disks are laminated and stored in a compact manner; and a mechanism device for loading/conveying optical disks from the laminated trays to a plurality of the recording/reproducing devices.

The following discusses the operations of returning conventional optical disks (hereinafter, simply referred to as "conventional disks" as a matter of convenience) such as CDs (compact discs) and DVDs (digital versatile discs) from drive devices to disk cartridges.

When a conventional disk is unloaded from a tray of a drive device (drive tray), the positional shift of the conventional disk is very small. This is because the wall of the drive tray is tapered, and therefore the conventional disk is placed at a predetermined position of the drive tray.

When a conventional disk is placed on the tray (disk tray) of the disk cartridge, the conventional disk falls from the disk tray along a tapered wall of the disk tray, so that the conventional disk lands at a predetermined position by gravity.

Next, the following discusses the operation of returning the thin optical disk from the drive device to the disk cartridge.

When the thin optical disk is unloaded from the drive tray, the thin optical disk is lighter than a conventional disk, and therefore even if the wall of the drive tray is tapered, the thin optical disk is placed at a position displaced from the predetermined position of the drive tray, and the thin optical disk may be unloaded in the displaced state. That is to say, the thin optical disk may be conveyed in a state where the center is displaced.

When the thin optical disk is loaded to the disk tray, the thin optical disk is lighter than the conventional disk, and therefore even if the wall of the drive tray is tapered, the thin optical disk may be conveyed with its center displaced, and may not be able to land in the predetermined position of the disk tray by gravity. That is to say, the thin optical disk may not be properly placed on the disk tray, and consequently it may not be possible to put the disk tray in the disk cartridge.

Furthermore, patent document 4 discloses a cartridge for storing plural thin information recording media, a method of loading the information recording medium stored in the cartridge, and a recording/reproducing device including the loading mechanism.

However, with the cartridge and conveying mechanism disclosed in patent documents 1 and 4, only one or two optical disks can be used simultaneously.

One approach is to use plural drive devices. However, a flexible thin disk has low rigidity, and is thus difficult to handle and convey. Therefore, it takes a long time to convey plural thin optical disks to plural drive devices.

Furthermore, patent document 5 discloses a mechanism device with which trays are opened at once to reduce the conveying time. However, this mechanism requires multiple suction tweezers, and consequently the overall size of the device needs to be increased.

Patent Document 1: Japanese Laid-Open Patent Publication No. 2004-22011

Patent Document 2: Japanese Laid-Open Patent Publication No. 2006-79786

Patent Document 3: Japanese Laid-Open Patent Publication No. 2007-287242

Patent Document 4: Japanese Laid-Open Patent Publication No. 2007-12201

Patent Document 5: Japanese Laid-Open Patent Publication No. 2009-238258

SUMMARY OF THE INVENTION

The present invention provides a disk laminate, a disk cartridge, a disk loading/unloading mechanism, a disk conveying device, a disk conveying mechanism, and a thin disk driving system, in which one or more of the above-described disadvantages are eliminated.

A preferred embodiment of the present invention provides a disk laminate with which disks can be easily unloaded from the disk cartridge and the recording capacity per disk cartridge can be increased. Furthermore, a preferred embodiment of the present invention provides a disk cartridge with which thin disks can be easily unloaded, and the recording capacity can be increased.

A preferred embodiment of the present invention provides a disk loading/unloading mechanism capable of loading/unloading thin disks into and from a disk cartridge with high precision. Furthermore, a preferred embodiment of the present invention provides a disk conveying device capable of conveying thin disks with high precision.

A preferred embodiment of the present invention provides a disk conveying mechanism capable of conveying plural thin disks between a disk cartridge and plural drive devices at high speed. Furthermore, a preferred embodiment of the present invention provides a thin disk driving system capable of conveying plural thin disks between a disk cartridge and plural drive devices at high speed, and with which the system size can be reduced.

According to an aspect of the present invention, there is provided a disk laminate including thin disks laminated to each other, which are to be suctioned and conveyed; and spacers provided between the thin disks to prevent the thin disks from directly contacting each other, the spacers having air permeability.

According to an aspect of the present invention, there is provided a disk loading/unloading mechanism for loading and unloading a thin disk to and from a disk cartridge, the disk cartridge including a disk tray on which the thin disk is placed, the disk tray being drawn out from and put into the disk cartridge, the disk tray having an opening at a center part thereof, the disk loading/unloading mechanism including an elevating mechanism including an elevating shaft being movable up and down through the opening so that part of a leading edge of the elevating shaft can be inserted into a center hole of the thin disk, the elevating mechanism being positioned below the opening of the disk tray when the disk tray is drawn out; and a disk holding mechanism including a holding member that holds the thin disk and a supporting shaft that supports the holding member, the supporting shaft being parallel to the elevating shaft, wherein a central axis of the supporting shaft and a central axis of the elevating shaft correspond to each other when the holding member is positioned above the disk tray.

According to an aspect of the present invention, there is provided a disk conveying mechanism used in a thin disk driving system including a disk cartridge and drive devices, the disk cartridge storing a disk laminate formed of thin disks, the drive devices performing at least reproducing of the thin disks among reproducing and recording, the disk conveying mechanism including holding mechanisms that hold the thin disks; arms having first ends to which the holding mechanisms are attached and second ends that are fixed to a rotational shaft; and an actuating device that rotates the rotational shaft, wherein the rotational shaft is provided at a position such that a center of the disk laminate and centers of drive trays drawn out from the drive devices are arranged along the same circumference centered at the rotational shaft with intervals of equal center angles, and the center angles are equal to at least one of center angles between the arms.

According to an aspect of the present invention, there is provided a disk conveying mechanism used in a thin disk driving system including a disk cartridge and drive devices, the disk cartridge storing a disk laminate formed of thin disks and spacers provided between the thin disks, the drive devices performing at least reproducing of the thin disks among reproducing and recording, the disk conveying mechanism including holding mechanisms that hold the thin disks; a spacer stocker on which the spacers are temporarily placed; arms having first ends to which the holding mechanisms are attached and second ends that are fixed to a rotational shaft; and an actuating device that rotates the rotating shaft, wherein the rotational shaft is provided at a position such that a center of the disk laminate, a center of the spacer stocker, and centers of drive trays drawn out from the drive devices are arranged along the same circumference centered at the rotational shaft with intervals of equal center angles, and the center angles are equal to at least one of center angles between the arms.

BRIEF DESCRIPTION OF THE DRAWINGS

Other objects, features and advantages of the present invention will become more apparent from the following detailed description when read in conjunction with the accompanying drawings, in which:

FIG. 13 indicates the relationship between the air permeability of the spacer and whether the spacer is lifted up together with the thin optical disk when the thin optical disk is suctioned and conveyed;

FIG. 15 indicates the relationship between the air permeability of the ring-shaped region of the spacer and whether the thin optical disk is lifted up together with the spacer when the spacer is suctioned and conveyed;

FIG. 40 is for describing operations of the disk conveying mechanism (part 3);

FIG. 41 is for describing a first operation example (part 1);

FIG. 42 is for describing the first operation example (part 2);

FIG. 43 is for describing the first operation example (part 3);

FIG. 44 is for describing a second operation example (part 1);

FIG. 45 is for describing the second operation example (part 2);

FIG. 46 is for describing a third operation example;

FIG. 47 is for describing a fourth operation example;

FIG. 48 is for describing a fifth operation example;

FIG. 49 is for describing a sixth operation example;

FIG. 51 is for describing an operation example corresponding to the disk conveying mechanism of FIG. 50; and FIG. 52 illustrates a modification of the thin disk recording/reproducing device.

DETAILED DESCRIPTION OF THE PREFERRED EMBODIMENTS

A description is given, with reference to accompanying drawings, of embodiments of the present invention.

Figure 1:
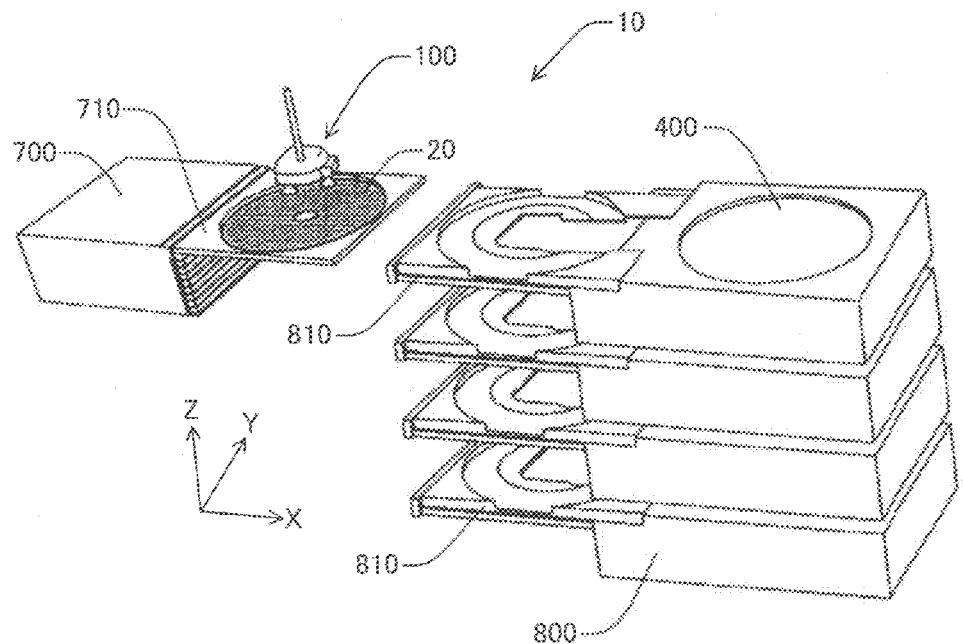
FIG. 1 illustrates a disk changer according to an embodiment of the present invention.

FIG. 1 illustrates a disk changer 10 according to an embodiment of the present invention. The direction orthogonal to the floor on which the thin disk recording/reproducing device 10 is placed is a Z axis direction. The two directions orthogonal to each other in a plane parallel to the floor are an X axis direction and a Y axis direction.

The disk changer 10 includes a disk conveying mechanism 100, a disk cartridge 700, four drive devices 800, and a control device (not shown).

The control device includes a CPU, a ROM storing programs described in codes readable by the CPU and various data items used for executing the programs, a RAM which is a working memory, and a communications interface that controls communications with a higher-level device (for example, a personal computer).

Figure 2:
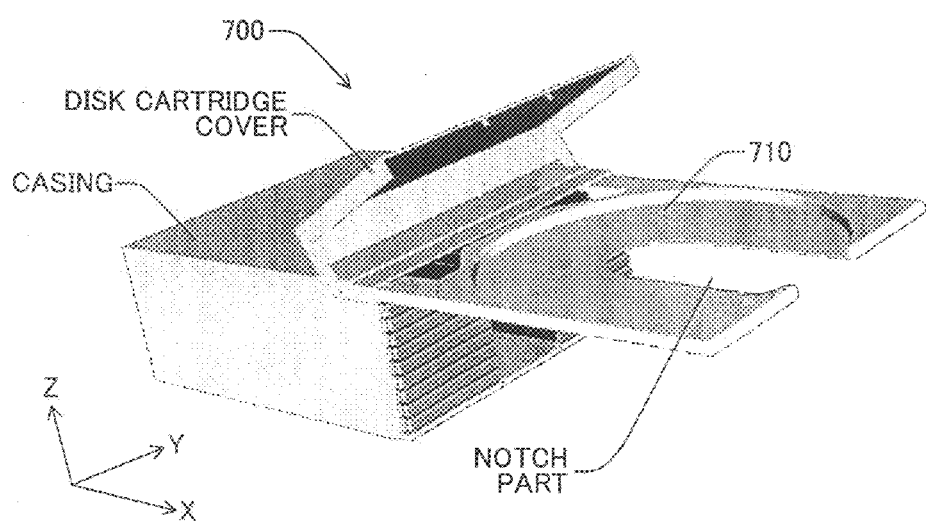
FIG. 2 illustrates a disk cartridge.

The disk cartridge 700 has, for example, ten stages of disk trays 710 as illustrated in FIG. 2.

Each disk tray 710 can be stored in the casing of the disk cartridge 700, and can be drawn out from the casing. In the disk cartridge 700, the disk trays 710 are stored so as to be drawn out in the +X direction Each disk tray 710 stores a disk laminate 20 formed by laminating plural thin optical disks with spacers provided therebetween.

Figure 3:
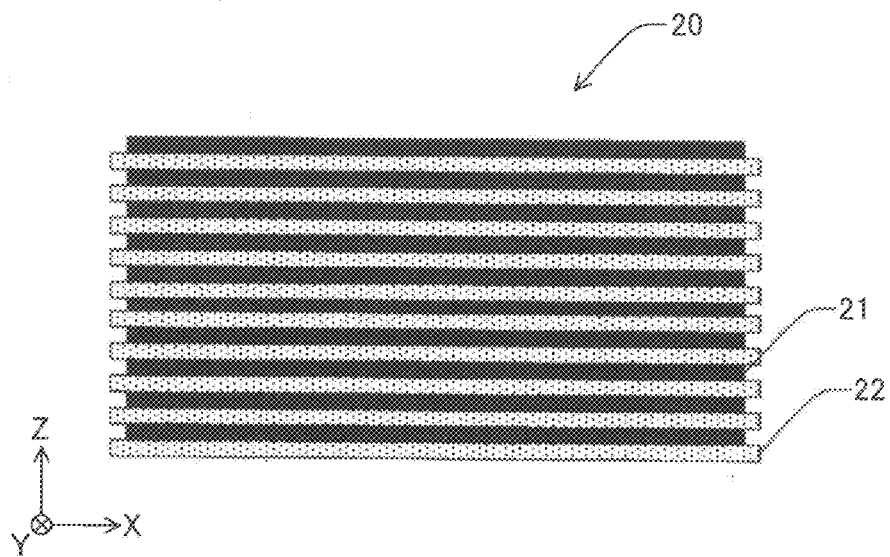
FIG. 3 illustrates a disk laminate.

The disk laminate 20 includes, for example, 10 thin optical disks 21 as illustrated in FIG. 3.

Furthermore, in the disk laminate 20, the spacers 22 are not only provided between the thin optical disks 21; the disk laminate 20 also has a spacer 22 located on the furthest −Z side of the disk laminate 20, contacting the disk tray 710.

Figure 4:
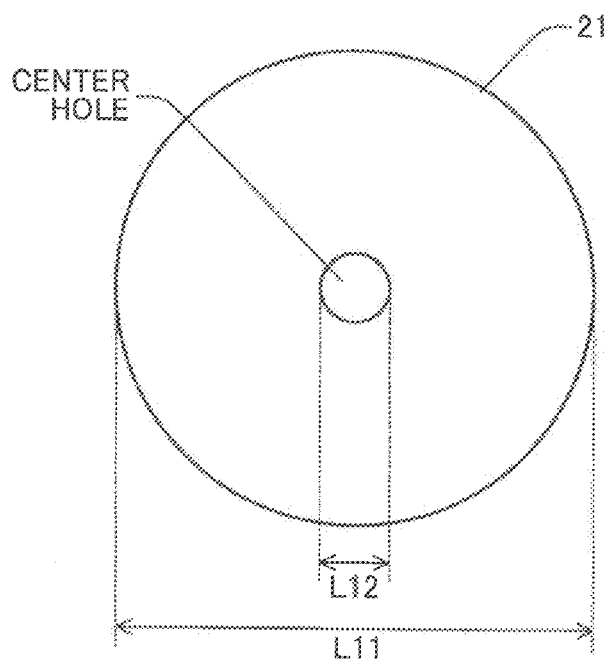
FIG. 4 illustrates a thin optical disk.

For example, as shown in FIG. 4, the thin optical disk 21 is a circular disk having an outer diameter L11 and an opening (center hole) having a diameter L12 in the center. In this example, L11=120 mm and L12=15 mm.

The thin optical disk 21 is formed by applying a recording film on a plastic film having a thickness of 0.2 mm, and does not have air permeability.

Figure 5:
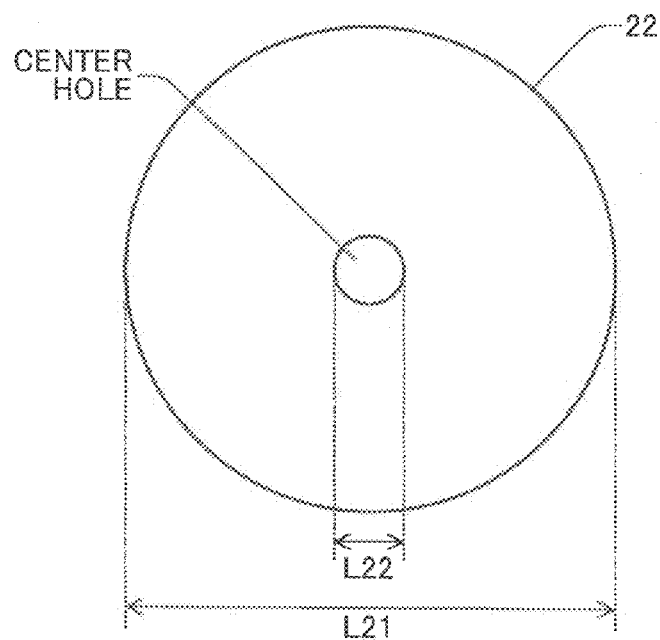
FIG. 5 illustrates a spacer.

For example, as shown in FIG. 5, the spacer 22 is a circular disk having an outer diameter L21 and an opening (center hole) having a diameter L22 in the center. In this example, L21=123 mm and L22=15 mm. Details of the spacer 22 are described below.

In the disk laminate 20, the plural thin optical disks 21 and the plural spacers 22 are laminated such that their center holes match in a planar view. In the following description, the center holes of the laminated thin optical disks 21 and spacers 22 are also referred to as the center hole of the disk laminate 20.

Referring back to FIG. 1, the four drive devices 800 are stacked on each other. On the top surface of the casing of the topmost drive device 800, there is provided a spacer stocker 400 for temporarily placing the spacer 22.

The drive devices 800 include drive trays 810 on which the thin optical disks 21 are placed. The drive devices 800 are disposed such that the drive trays 810 can be drawn out in the −X direction.

Figure 6:
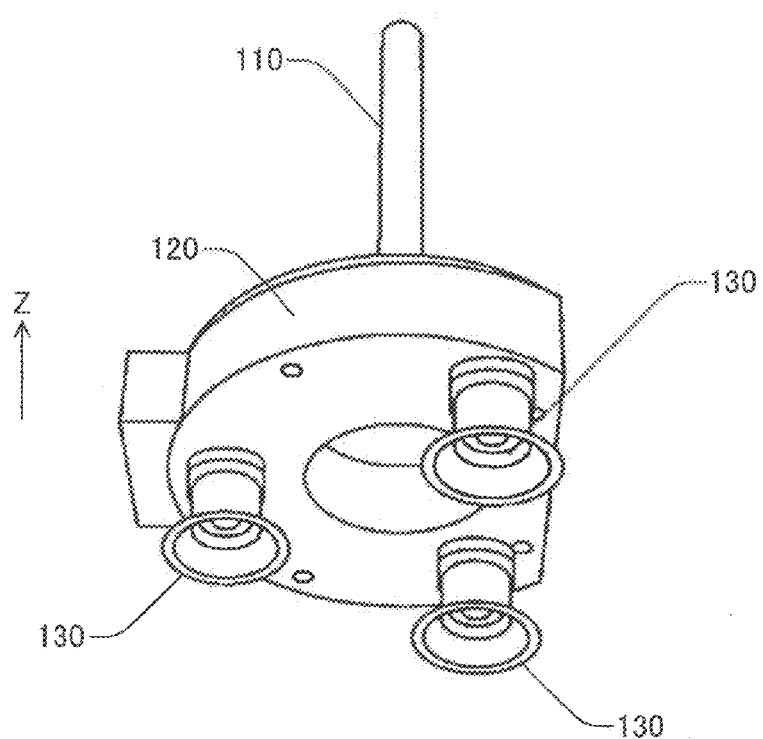
FIG. 6 illustrates a suction mechanism of a disk conveying mechanism.

As shown in FIG. 6, the disk conveying mechanism 100 includes a suction mechanism including an elevating shaft 110 parallel to the Z axis, a block type suction holding member 120 mounted on the −Z end of the elevating shaft 110, three suction disks 130 held on the −Z side surface of the suction holding member 120 so as to be facing the −Z direction, a driving system (not shown) for moving (elevating/lowering) the elevating shaft 110 in the Z axis direction, a vacuum pump (not shown), a pipe connecting the vacuum pump and the suction disks 130, and an electromagnetic valve (not shown) that is provided in the pipe and that is opened and closed by the control device.

By opening the electromagnetic valve, the suction disks 130 can vacuum-suction the thin optical disks 21 and the spacers 22. By closing the electromagnetic valve, air is guided in the suction disks 130, so that the suctioned state is released.

Furthermore, the disk conveying mechanism 100 includes an arm mechanism (not shown) for moving the suction mechanism in the horizontal direction.

Furthermore, the disk conveying mechanism 100 includes a mechanism (not shown) for moving the disk trays 710 into and out from the casing of the disk cartridge 700.

Figure 7:
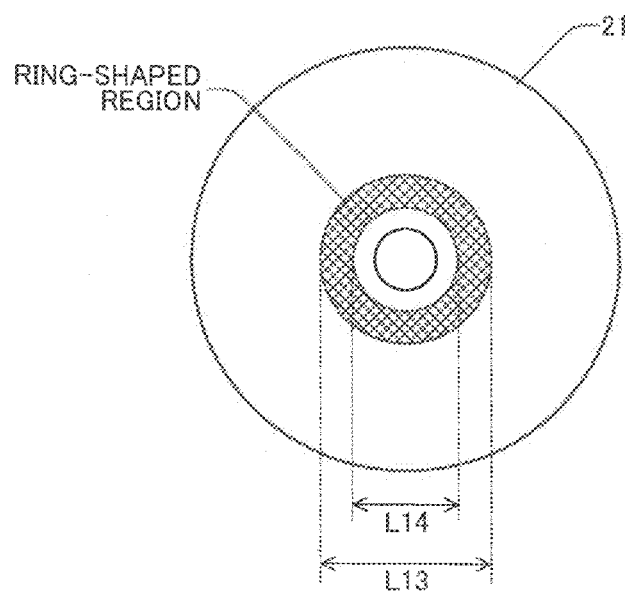
FIG. 7 illustrates a ring-shaped region in the thin optical disk.

The region within 12.5 mm (radius) from the center of the thin optical disk 21 is not used for recording/reproducing information. Accordingly, the suction disks 130 are located so as to suction the ring-shaped region extending from 10 mm through 12.5 mm (radius) from the center of the thin optical disk (see FIG. 7). That is to say, in FIG. 7, L13 is 25 mm and L14 is 20 mm.

Next, details are given of conveying procedures.

A-1. When Recording or Reproducing is Performed for Thin Optical Disks 21 Using All Drive Devices 800

Figure 8:
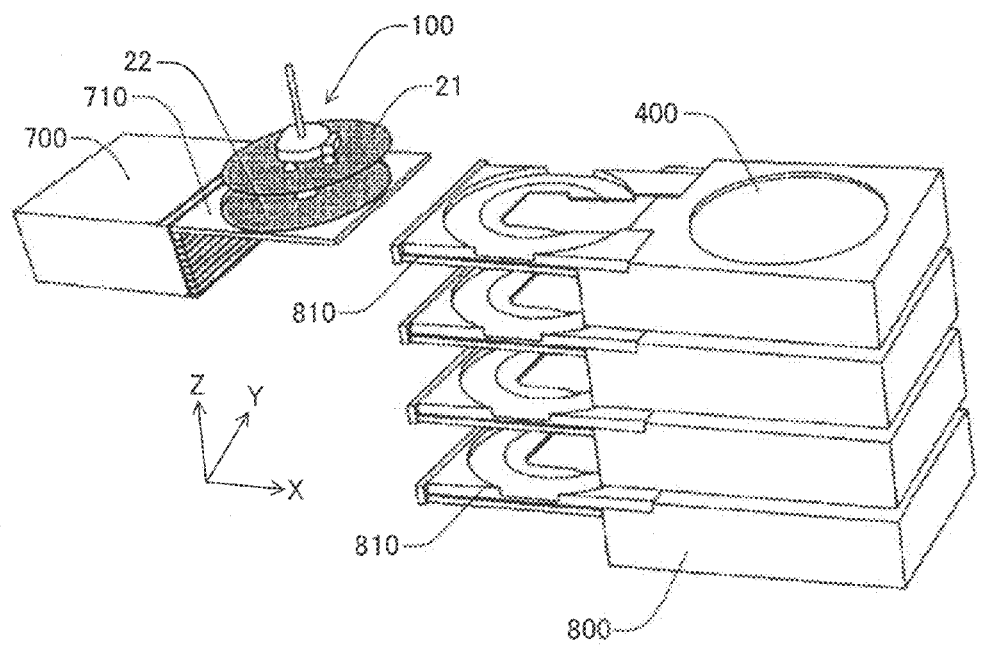
FIG. 8 is for describing an operation of the disk conveying mechanism (part 1)
Figure 9:
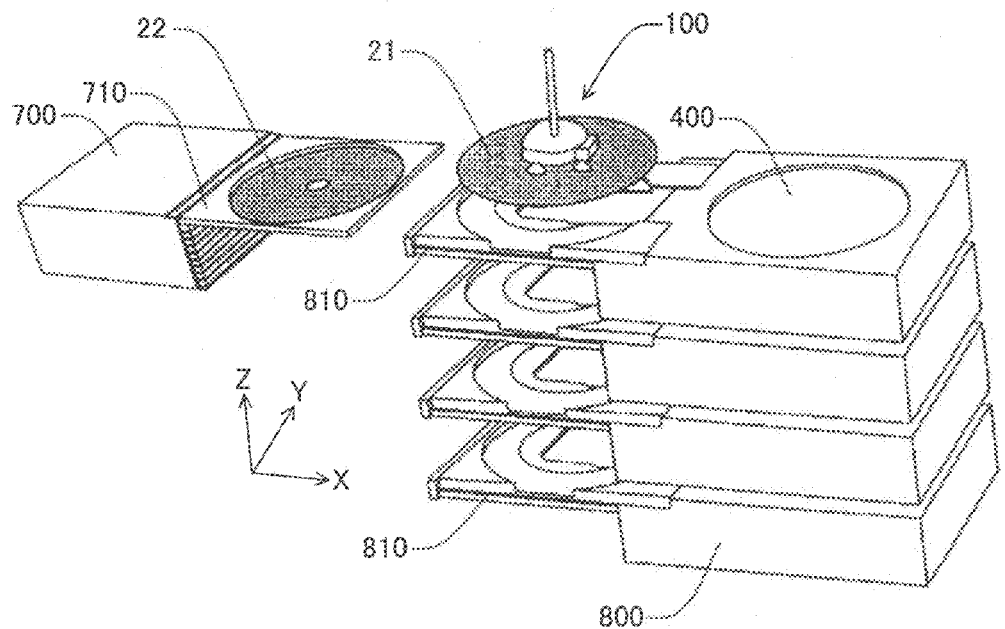
FIG. 9 is for describing the operation of the disk conveying mechanism (part 2)
Figure 10:
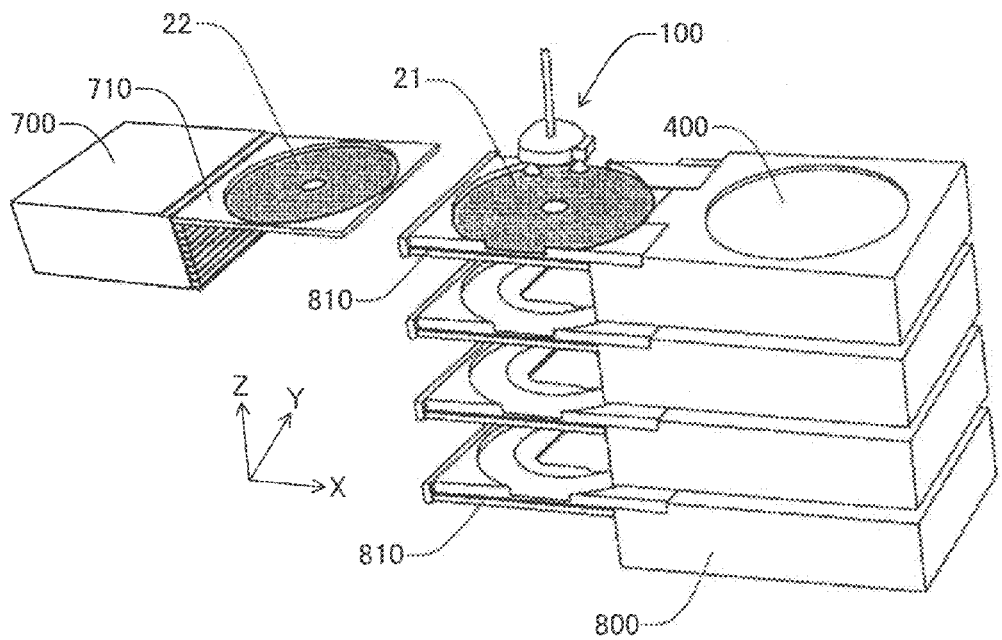
FIG. 10 is for describing the operation of the disk conveying mechanism (part 3)

(A1) The disk tray 710 is drawn out from the disk cartridge 700.
(A2) The suction mechanism is moved to the +Z side of the disk tray 710 that has been drawn out.
(A3) The suction holding member 120 is lowered, and the three suction disks 130 suction the thin optical disk 21 on the topmost face of the disk laminate 20.
(A4) The suction holding member 120 is elevated, and the suctioned thin optical disk 21 is separated from the disk laminate 20 (see FIG. 8).
(A5) The drive tray 810 is drawn out.
(A6) The suction mechanism that is suctioning the thin optical disk 21 is moved immediately above the drive tray 810 that has been drawn out (see FIG. 9).
(A7) The suction holding member 120 that is suctioning the thin optical disk 21 is lowered, and the vacuum state is released. Accordingly, the thin optical disk 21 is placed on the drive tray 810 (see FIG. 10).
(A8) The suction holding member 120 is elevated.
(A9) The drive tray 810 is put into the casing of the drive device 800.
(A10) The suction mechanism is moved to the +Z side of the disk tray 710 that is drawn out.
(A11) The suction holding member 120 is lowered, and the three suction disks 130 suction the spacer 22 on the topmost face of the disk laminate 20.
(A12) The suction holding member 120 is elevated, and the suctioned spacer 22 is separated from the disk laminate 20.

Figure 11:
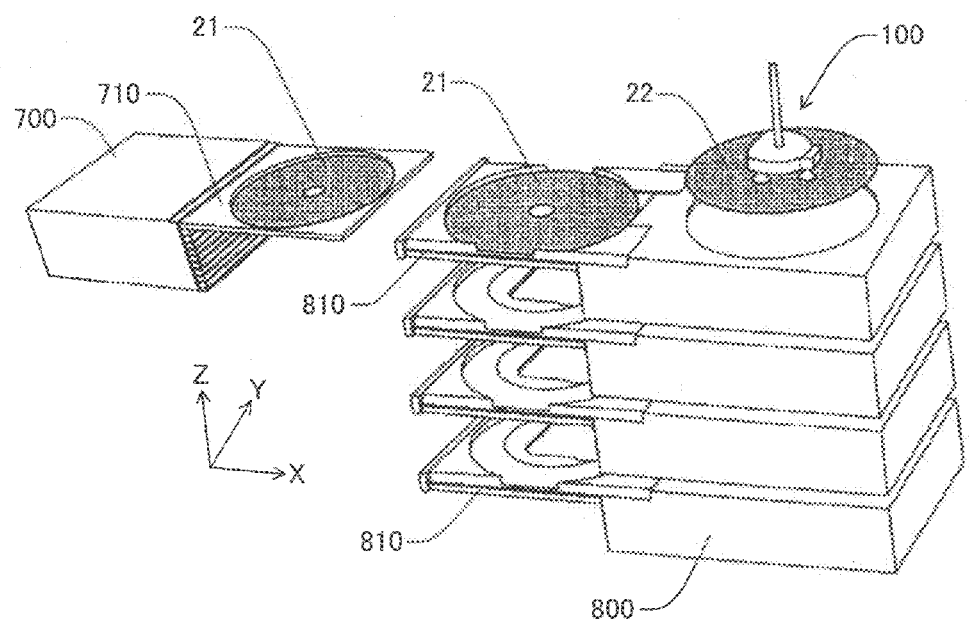
FIG. 11 is for describing the operation of the disk conveying mechanism (part 4)
Figure 12:
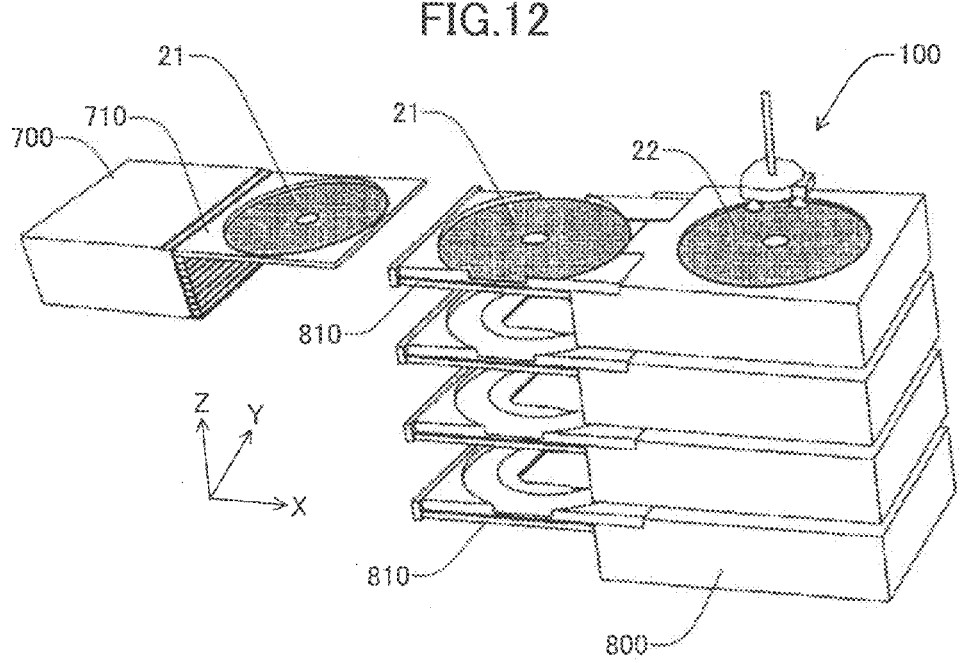
FIG. 12 is for describing the operation of the disk conveying mechanism (part 5)

(A13) The suction mechanism that is suctioning the spacer 22 is moved immediately above the spacer stocker 400 (see FIG. 11).
(A14) The suction holding member 120 that is suctioning the spacer 22 is lowered, and the vacuum state is released. Accordingly, the spacer 22 is placed on the spacer stocker 400 (see FIG. 12).
(A15) The suction holding member 120 is elevated.
(A16) The position of the arm in the Z axis direction is adjusted according to the position of the next drive tray 810 in the Z axis direction.

The processes of (A1) through (A16) are repeatedly performed until the thin optical disks 21 are set in the drive trays 810 of all of the drive devices 800, and recording or reproducing is performed for each of the thin optical disks 21.

B-1. When Recording or Reproducing has Ended, and All Thin Optical Disks 21 are Returned to Disk cartridge 700

(B1) The suction mechanism is moved immediately above the spacer stocker 400.
(B2) The suction holding member 120 is lowered, and the three suction disks 130 suction the spacer 22 on the spacer stocker 400.
(B3) The suction holding member 120 is elevated, and the suctioned spacer 22 is separated from the spacer stocker 400.
(B4) The suction mechanism that is suctioning the spacer 22 is moved immediately above the disk tray 710.
(B5) The suction holding member 120 that is suctioning the spacer 22 is lowered.
(B6) The vacuum state of the suction disks 130 suctioning the spacer 22 is released. Accordingly, the spacer 22 is placed on the disk tray 710.
(B7) The suction holding member 120 is elevated.
(B8) The suction mechanism is moved immediately above the drive tray 810 that has been drawn out.
(B9) The position of the arm in the Z axis direction is adjusted according to the position in the Z axis direction of the drive tray 810 on the furthest −Z side. In this example, the position of the arm in the Z axis direction is adjusted to be slightly to the +Z side of the bottommost drive tray 810 in which the thin optical disk 21 is placed.
(B10) The bottommost drive tray 810 in which the thin optical disk 21 is placed is drawn out.
(B11) The suction mechanism is moved on the +Z side of the drive tray 810.
(B12) The suction holding member 120 is lowered, and the three suction disks 130 suction the thin optical disk 21 on the drive tray 810.
(B13) The suction holding member 120 is elevated, and the suctioned thin optical disk 21 is separated from the drive tray 810.
(B14) The drive tray 810 from which the thin optical disk 21 has been taken out is put in the casing of the drive device 800.
(B15) The suction mechanism that is suctioning the thin optical disk 21 is moved immediately above the disk tray 710.
(B16) The suction holding member 120 that is suctioning the thin optical disk 21 is lowered.
(B17) The vacuum state of the suction disks 130 suctioning the thin optical disk 21 is released. Accordingly, the thin optical disk 21 is placed on the spacer 22 on the disk tray 710.
(B18) The suction holding member 120 is elevated.

The processes of (B1) through (B18) are repeatedly performed until all of the spacers 22 on the spacer stocker 400 and all of the thin optical disks 21 are placed on the disk tray 710.

(B19) The disk tray 710 is put in the disk cartridge 700.

The above operations are programmed, and the program is stored in the ROM of the control device. That is to say, the above operations are executed according to instructions from the control device.

As described above, the thin optical disks 21 and the spacers 22 are stacked onto each other when they are stored in the disk tray 710, but when recording or reproducing is performed, each thin optical disk 21 or spacer 22 is separated from/conveyed away from the stack.

Accordingly, the suction mechanism needs to suction one thin optical disk 21 or spacer 22 at a time from the disk laminate 20. There are two important operations as described below. One is when the suction mechanism suctions the thin optical disk 21, and the other one is when the suction mechanism suctions the spacer 22.

1. When Suction Mechanism Suctions Thin Optical Disk 21

In this case, the spacer 22 is located immediately below the thin optical disk 21. The thin optical disk 21 is a smooth film member without any air permeability. Accordingly, when the suction holding member 120 is elevated while the three suction disks 130 are suctioning the thin optical disk 21, negative pressure is generated between the thin optical disk 21 and the spacer 22.

Thus, if the suction holding member 120 is elevated by approximately three centimeters within one second or less, the spacer 22 located immediately below the thin optical disk 21 may be lifted together with the thin optical disk 21. This happens due to the negative pressure between the thin optical disk 21 and the spacer 22 immediately below the thin optical disk 21. Therefore, to prevent this from happening, the negative pressure is to be mitigated.

Accordingly, as shown in FIG. 13, an experiment was performed by creating six types of spacers having different levels of air permeability (1-1 through 1-6), and it was confirmed whether these spacers are lifted up together with thin optical disks. Each spacer is a nonwoven cloth made of polyester having a thickness of 0.2 mm, which is a circular disk with an outer diameter of 123 mm having a center hole with a diameter of 15 mm. That is to say, these spacers 1-1 through 1-6 appear to be the same as the spacer 22. Furthermore, each of the spacers 1-1 through 1-6 has a weight per unit area (1 $m^2$) of 60 g.

The nonwoven cloth is made by using fibers having an average diameter of approximately 1 μm through 50 μm, which are adhered to each other to form a cloth by performing thermal fusion bonding or by using an adhesive. The air permeability of the nonwoven cloth can be adjusted by changing the diameter of the fibers.

The air permeability described in the present application corresponds to evaluations by the fragile process specified in JIS L1096 (Japanese Industrial Standards). Specifically, the flow rate when the pressure difference is 125 Pa is set as the air permeability.

Thin optical disks were formed by applying a recording film on a polycarbonate film having a thickness of 120 μm by a sputtering process, and forming a protection film made of ultraviolet curable resin.

In this experiment, one disk laminate was formed for each spacer type. Each disk laminate included ten pairs of thin optical disks and spacers laminated on each other.

The disk laminate was placed on a disk tray, and the thin optical disk was lifted with a suction mechanism by three centimeters within 0.4 seconds. Then, the thin optical disk was held for two seconds.

It was determined that the spacer was lifted up together with the thin optical disk (yes), when the spacer was lifted up together with the thin optical disk being lifted up by the suction mechanism and the spacer adhered to the thin optical disk for one second or more after the suction mechanism was stopped.

As shown in FIG. 13, when the air permeability exceeds 100 $cc/cm^2$/sec., the spacer was prevented from being lifted up together with the thin optical disk. Accordingly, the air permeability of the spacer preferably exceeds 100 $cc/cm^2$/sec.

When the thickness of the nonwoven cloth exceeds 0.2 mm, the threshold of the air permeability may change from 100 $cc/cm^2$/sec.

As a comparative example, the same experiment was conducted with the use of a spacer made of a nonwoven cloth having a thickness of 0.5 mm, a weight per unit area (1 $m^2$) of 100 g, and air permeability of 100 $cc/cm^2$/sec. In this case, the spacer (comparative example) separated from the thin optical disk and fell into the disk tray within 0.5 seconds after the suction mechanism was elevated. That is to say, it was evaluated that the spacer was not lifted up together with the thin optical disk (no). However, if the spacer is thick, the thickness of the disk laminate increases, and therefore the number of thin optical disks that can be stored in the disk tray decreases, and consequently the recording capacity per disk cartridge decreases.

In this regard, there is an upper limit to the thickness of the spacer. In practical situations, the thickness of the spacer is considered to be the same as the thin optical disk or to be two times as thick as the thin optical disk. Therefore, a spacer having a thickness of 0.2 mm is considered to be appropriate for practical use.

2. When Suction Mechanism Suctions Spacer 22

In this case, the thin optical disk 21 is located immediately below the spacer 22. When the spacer has high air permeability, the spacer cannot be vacuum-suctioned, and therefore the suction mechanism cannot lift up the spacer.

Furthermore, if the vacuum pump has excessive exhaust properties, the negative pressure reaches the thin optical disk immediately below the spacer. Therefore, when the spacer is suctioned, the thin optical disk immediately below the spacer may be suctioned together with the spacer.

Figure 14:
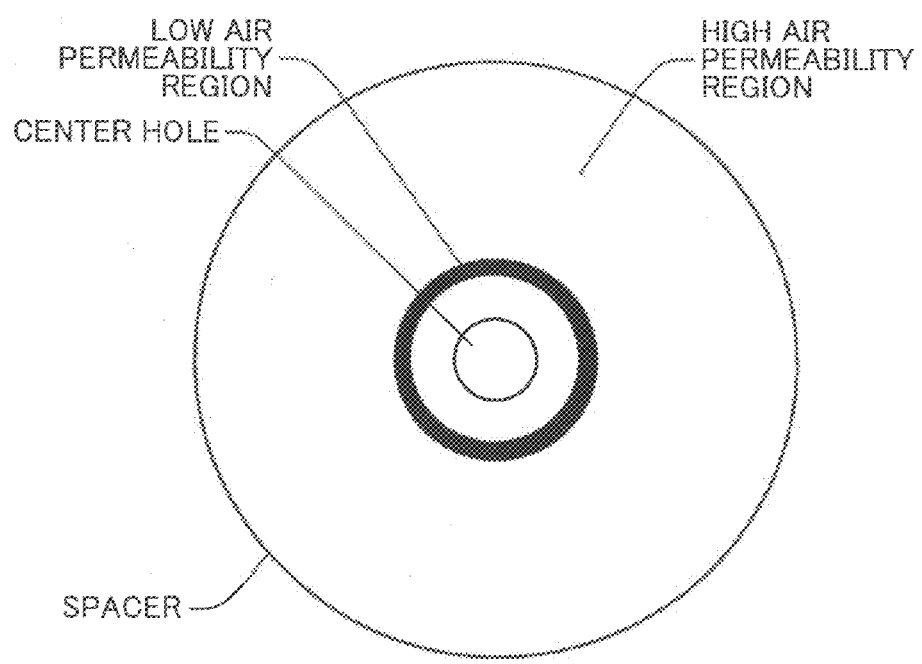
FIG. 14 is for describing a region having low air permeability of the spacer.

Thus, the air permeability of the spacer was decreased only in the ring-shaped region including at least part of the region that comes in contact with the suction disks (see FIG. 14). In this example, a nonwoven cloth made of polyester was used, having an outer diameter of 123 mm, an inner diameter of 15 mm, a thickness of 160 μm, and a weight per unit area (1 $m^2$) of 30 g. Paper was adhered to the spacer, only in the ring-shaped region including the region that comes in contact with the suction disks, to decrease the air permeability. The ring-shaped region is the same as the ring-shaped region of the thin optical disk 21 described above.

As shown in FIG. 15, the six types of spacers (2-1 through 2-6) having ring-shaped regions of different air permeability levels were formed by adhering paper pieces of different air permeability levels in the respective ring-shaped regions, and the same experiment as that described above was performed.

As a result, the thin optical disk was lifted together with the spacer when the air permeability of the ring-shaped region exceeded 1 $cc/cm^2$/sec. Thus, the thin optical disk can be prevented from being lifted together with the spacer if the air permeability in the ring-shaped region of the spacer is less than 1 cc/cm$^2$/sec.

If the thin optical disk was thick and heavy, the appropriate level of air permeability in the ring-shaped region may be different. However, the practical thickness of the thin optical disk is approximately 0.1 mm through 0.2 mm, and therefore, the practical air permeability of the ring-shaped region is less than 1 cc/cm$^2$/sec.

In the spacer 22 according to the present embodiment, the air permeability of the ring-shaped region is 0.5 cc/cm$^2$/sec.

That is to say, the spacer 22 includes a region with a relatively high level of air permeability and a region with a relatively low level of air permeability. The air permeability in the high-air-permeability region exceeds 100 cm$^3$/cm$^2$/sec., and the air permeability in the low-air-permeability region is less than 1 cm$^3$/cm$^2$/sec.

One disk laminate was formed for each of the above-described six types of spacers (1-1 through 1-6) (i.e., six disk laminates were formed), in which corresponding spacers were laminated with thin optical disks. The disk laminates were placed on the disk trays, and the disk trays were put in the disk cartridge. This was left in an atmosphere of 80° C. and 85% RH for 1000 hours. Subsequently, the drive device performed recording and reproducing for these thin optical disks, and no abnormalities were found. Then, the disk cartridge was disassembled, and it was found that none of the thin optical disks and spacers were adhering to each other.

Figure 16:
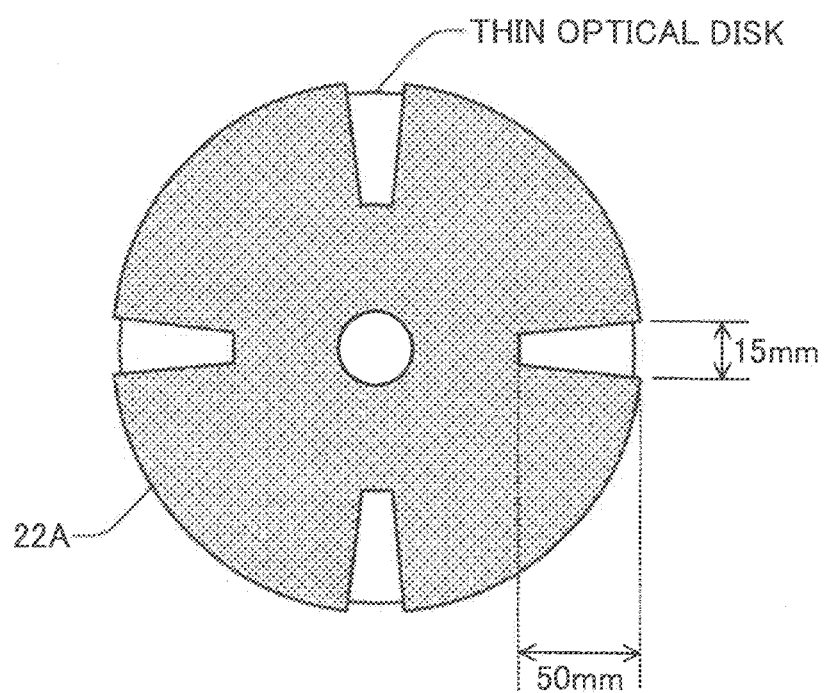
FIG. 16 illustrates a spacer having a different shape.

In comparative example 1, as shown in FIG. 16, a spacer 22A having approximately the same diameter as the spacer 22 but a different shape was used to perform the same experiment as above. The spacer 22A was formed with clean paper, and had air permeability of 0.5 cc/cm$^2$/sec. Cutout parts that are 50 mm deep and 15 mm wide in the circumferential direction were provided in four directions along the outer periphery. In this example, the thin optical disk was not lifted together with the spacer 22A. It is considered that the negative pressure was released through the large cutout parts on the outside of the spacer 22A.

However, if the thin optical disks and the spacers 22A are laminated, the thin optical disks directly adhere to each other at the cutout parts. When the disk cartridge is used for a long period of time, dust that has entered the disk cartridge adheres to the parts where the thin optical disks are directly contacting each other. Therefore, these parts may become damaged and data errors may occur. Therefore, the spacer needs to cover the entire thin optical disk, so that thin optical disks do not contact each other.

In comparative example 2, spacers having an outer diameter of 80 mm were formed with the same material as that of the six types of spaces described above (1-1 through 1-6). One disk laminate was formed for each of the six types of spacers (i.e., six disk laminates were formed). The disk laminates were placed in the disk trays, and the disk trays were stored in disk cartridges. This was left in an atmosphere of 80° C. and 85% RH for 1000 hours. Then, when the disk cartridge was disassembled, it was found that some parts of the outer peripheral areas of the thin optical disks had adhered to each other. This hampered the process of conveying the thin optical disks.

As described above, the disk changer 10 according to the present embodiment includes the disk conveying mechanism 100, the disk cartridge 700, four drive devices 800, and the control device.

In the disk cartridge 700, the disk laminate 20 placed on the disk trays 710 are stored. The disk laminate 20 is formed by laminating plural thin optical disks 21 with spacers 22 provided between the thin optical disks 21.

The spacer 22 has a larger diameter than the thin optical disk 21, and is made of a nonwoven cloth having air permeability. The ring-shaped region of the spacer 22, which includes a part of the region where the three suction disks 130 contact the spacer 22, has lower air permeability than that of the other regions of the spacer 22.

The thin optical disks 21 and the spacers 22 can be reliably separated one by one from the disk laminate 20, and therefore it is possible to prevent plural thin optical disks 21 and spacers 22 from being conveyed at once.

Furthermore, by making the spacer 22 have a larger outer diameter than the thin optical disk 21, it is possible to prevent thin optical disks from contacting each other. Therefore, it is possible to prevent thin optical disks from adhering to each other, and to prevent data errors caused by damages in the thin optical disks.

That is to say, (1) by using a nonwoven cloth with high air permeability as the spacer, the negative pressure between the thin optical disk and the spacer can be mitigated when the thin optical disk is lifted up by suction. Accordingly, the spacer immediately below the thin optical disk is prevented from being lifted up together with the thin optical disk.

(2) A part of the spacer is made to have low air permeability, and this region is vacuum-suctioned by suction disks to suction the spacer. When the spacer is suctioned, negative pressure is generated only between the suction disks and the spacer, and the negative pressure does not affect the thin optical disk below the suctioned spacer. Thus, when the spacer is lifted, the thin optical disk immediately below the suctioned spacer is not lifted up together with the spacer.

(3) The spacer has a larger outer diameter than the thin optical disk, and therefore when plural optical disks are laminated with spacers provided therebetween, the thin optical disks do not directly contact each other. Accordingly, the thin optical disks are prevented from adhering to each other.

In the above embodiment, the suction mechanism has three suction disks; however, the number of suction disks is not limited to three. Furthermore, different suction disks can be used for suctioning the thin optical disks and for suctioning the spacers.

For example, the suction mechanism may include three suction disks for suctioning the thin optical disk which are spaced away from the center of the suction holding member 120 by a first distance, and three suction disks for suctioning the spacer which are spaced away from the center of the suction holding member 120 by a second distance. That is to say, the ring-shaped region of the thin optical disk and the ring-shaped region of the spacer may have different distances from the center of the disk laminate. For example, the ring-shaped region of the spacer may have an inner diameter of 70 mm and an outer diameter of 80 mm.

Furthermore, in the above embodiment, the suction mechanism uses the suction disks 130 to suction the thin optical disk 21 and the spacer 22; however, the present invention is not so limited. Any means can be used as long as the thin optical disk 21 and the spacer 22 can be held by suction and released from suction.

Furthermore, in the above embodiment, the disk laminate 20 includes ten thin optical disks 21; however, the present invention is not so limited.

Furthermore, in the above embodiment, the disk cartridge 700 includes ten disk trays 710; however, the present invention is not so limited.

Furthermore, in the above embodiment, the thin disk is a thin optical disk; however, the present invention is not so limited. For example, the thin disk may be a thin magnetic disk.

As described above, with the disk laminate according to an embodiment of the present invention, disks can be easily unloaded from the disk cartridge and the recording capacity per disk cartridge can be increased. Furthermore, with the disk cartridge according to an embodiment of the present invention, thin disks can be easily unloaded, and the recording capacity can be increased.

Figure 17:
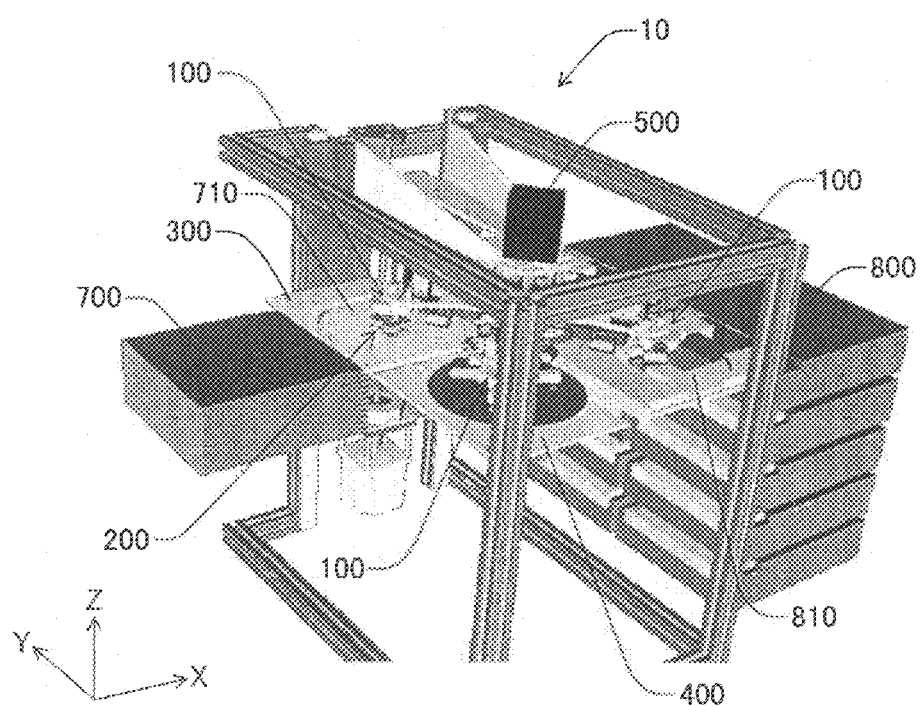
FIG. 17 illustrates a thin disk recording/reproducing device according to an embodiment of the present invention.

FIG. 17 illustrates a thin disk recording/reproducing device (referred to disk changer in FIG. 1) 10 according to an embodiment of the present invention. The direction orthogonal to the floor on which the thin disk recording/reproducing device 10 is placed is a Z axis direction. The two directions orthogonal to each other in a plane parallel to the floor are an X axis direction and a Y axis direction.

The thin disk recording/reproducing device 10 includes four suction mechanisms (referred to as disk conveying mechanism in FIG. 1) 100, a laminate elevating mechanism 200, a laminate stocker 300, a spacer stocker 400, a revolution conveying motor 500 (actuating device), a disk cartridge 700, ten drive devices 800, and a control device (not shown).

The control device includes a CPU, a ROM storing programs described in codes readable by the CPU and various data items used for executing the programs, a RAM which is a working memory, and a communications interface that controls communications with a higher-level device (for example, a personal computer).

The disk cartridge 700 has, for example, ten stages of disk trays 710 as illustrated in FIG. 2.

Figure 18:
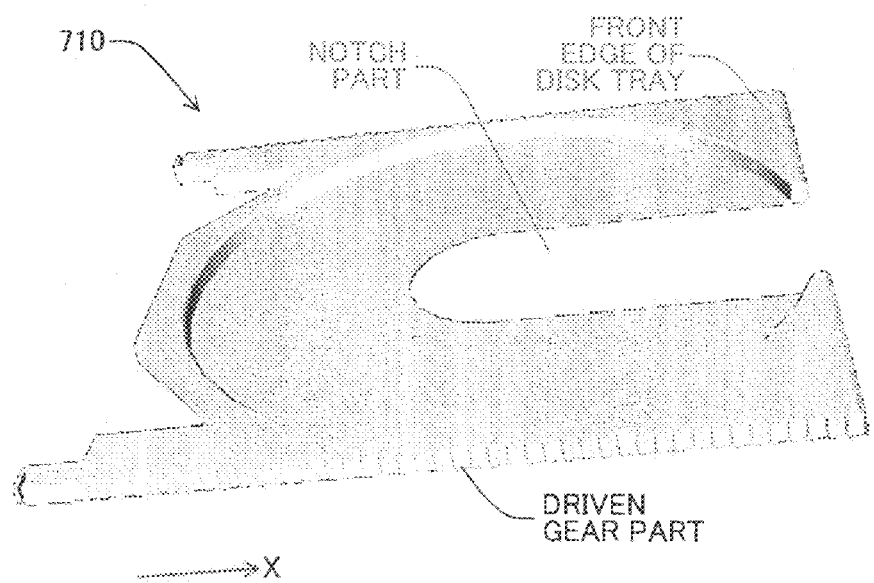
FIG. 18 illustrates a disk tray indicated in FIG. 2.

Each disk tray 710 can be stored in the casing of the disk cartridge 700, and can be drawn out from the casing. In the disk cartridge 700, the disk trays 710 are stored so as to be drawn out in the +X direction Each disk tray 710 has a notch part extending from the edge portion on the +X side toward the center part, as illustrated in the example of FIG. 18.

Each disk tray 710 stores a disk laminate 20 formed by laminating plural thin optical disks 21 with spacers 22 provided therebetween, as illustrated in the example of FIG. 3. In this example, the disk laminate 20 includes 10 thin optical disks 21.

For example, as shown in FIG. 4, the thin optical disk 21 is a circular disk having an outer diameter L11 and an opening (center hole) having a diameter L12 in the center. In this example, L11=120 mm and L12=15 mm.

The thin optical disk 21 is formed by applying a recording film on a plastic film having a thickness of 0.2 mm. The thickness of the thin optical disk 21 is not limited to 0.2 mm; for example, the thin optical disk 21 may have a thickness of 0.1 mm through 0.3 mm.

For example, as shown in FIG. 5, the spacer 22 is a circular disk having an outer diameter L21 and an opening (center hole) having a diameter L22 in the center. In this example, L21=123 mm and L22=15 mm. The thickness of the spacer 22 is the same as that of the thin optical disk 21.

In the disk laminate 20, the plural thin optical disks 21 and the plural spacers 22 are laminated such that their center holes match in a planar view. In the following description, the center holes of the laminated thin optical disks 21 and spacers 22 are also referred to as the center hole of the disk laminate 20.

Referring back to FIG. 17, the laminate stocker 300 is a plate member for temporarily holding the disk laminate 20, and the surface of the laminate stocker 300 is orthogonal to the Z axis.

The laminate stocker 300 can be moved (elevated and lowered) in the Z axis direction, and is positioned immediately below the disk tray 710 drawn out from the disk cartridge 700.

The laminate stocker 300 has an opening whose center substantially matches the center of the disk laminate 20 when the disk laminate 20 is placed on the laminate stocker 300.

The spacer stocker 400 is a plate member for temporarily storing the spacer 22, and the surface of the spacer stocker 400 is orthogonal to the Z axis.

The spacer stocker 400 can be moved (elevated and lowered) in the Z axis direction, and is positioned on the −Y side of the laminate stocker 300. The laminate stocker 300 and the spacer stocker 400 may be combined as a single unit.

The ten drive devices 800 are stacked into two drive units each including five drive devices 800. The first drive unit is referred to as a drive unit DU1, and the second drive unit is referred to as a drive unit DU2.

The drive unit DU1 is located on the +X side of the disk cartridge 700. The drive unit DU2 is located on the −Y side of the drive unit DU1. The drive devices 800 are positioned so that the drive trays 810 can be drawn out in the −X direction.

Figure 19:
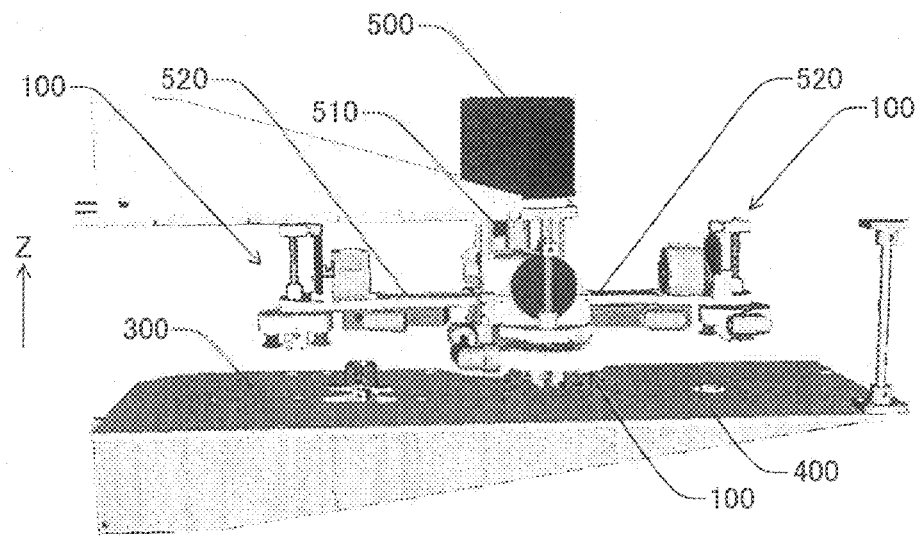
FIG. 19 illustrates the relationship between arms for moving suction mechanisms in the horizontal direction and a revolution conveying motor.

As shown in FIG. 19, the revolution conveying motor 500 includes a rotational shaft 510 parallel to the Z axis. The rotational shaft 510 has a plate member mounted parallel to the XY plane. The plate member has four arms 520 arranged in a cross.

The four suction mechanisms 100 are respectively mounted to the end parts of the four arms 520. When the revolution conveying motor 500 rotates, the four suction mechanisms 100 rotate in the XY plane.

The position of the four arms 520 in the Z axis direction may be adjusted in accordance with the position of the disk tray 710 in the Z axis direction. In this example, the position of the four arms 520 in the Z axis direction can be adjusted between five stages. The position of the four arms 520 in the Z axis direction is set in conjunction with the position of the laminate stocker 300 and the spacer stocker 400 in the Z axis direction.

Figure 20:
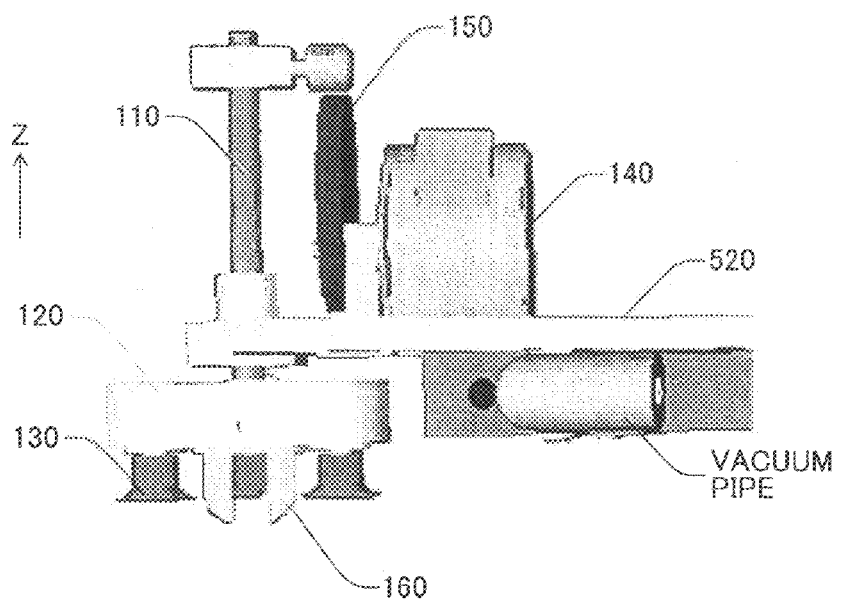
FIG. 20 illustrates the suction mechanism (part 1)
Figure 21:
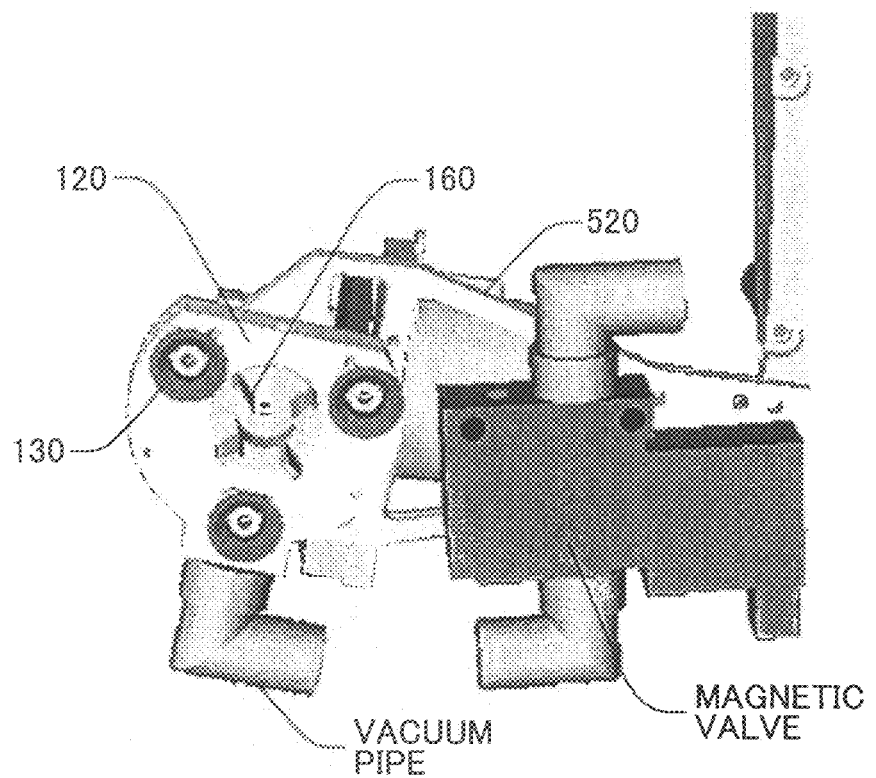
FIG. 21 illustrates the suction mechanism (part 2)
Figure 22A:
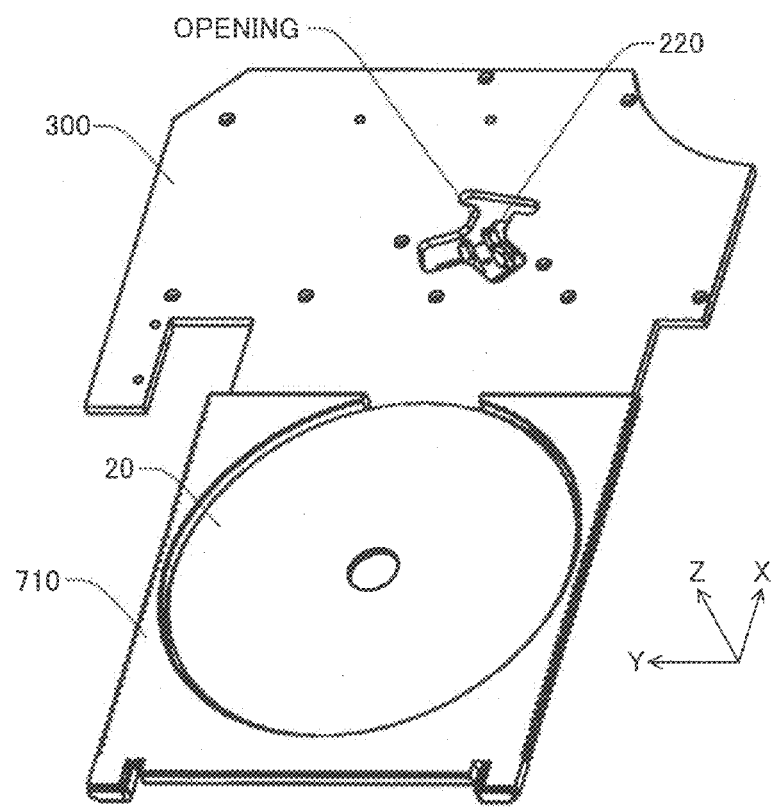
FIGS. 22A and 22B illustrate a laminate elevating mechanism (part 1)
Figure 22B:
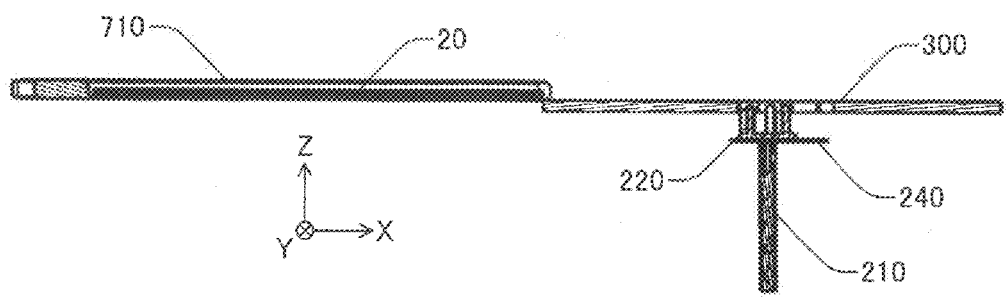
Figure 23:
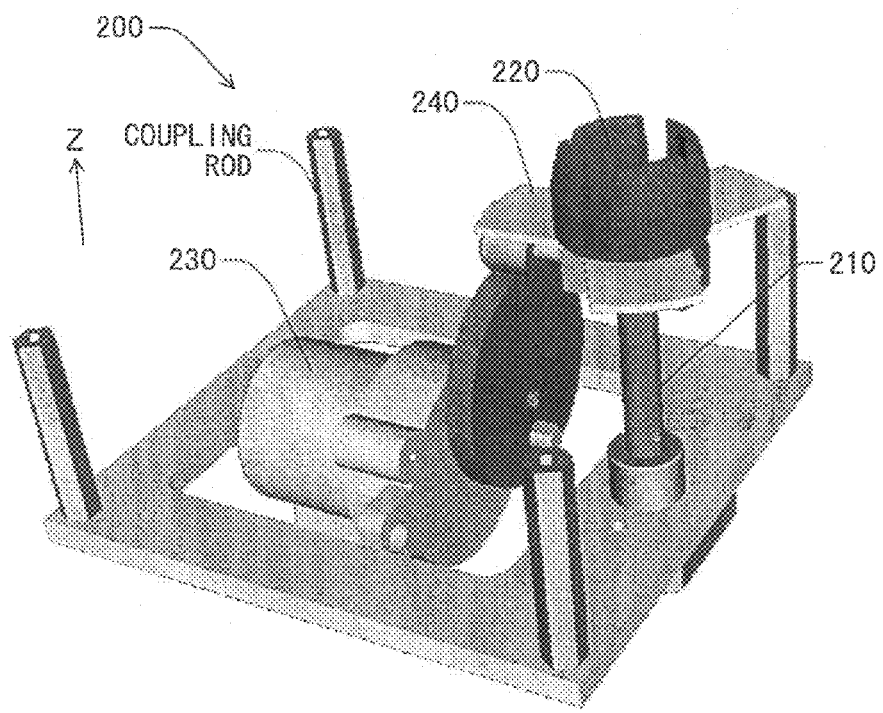
FIG. 23 illustrates the laminate elevating mechanism (part 2)
Figure 24:
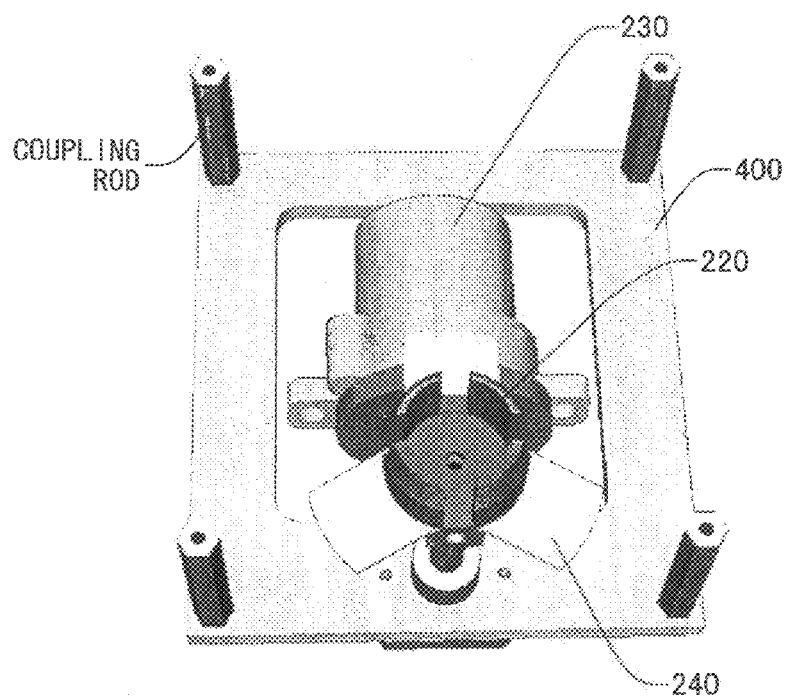
FIG. 24 illustrates the laminate elevating mechanism (part 3)

As shown in FIGS. 20, 21, and 6, the suction mechanism 100 includes an elevating shaft 110 parallel to the Z axis, a block type suction holding member 120 mounted on the −Z end of the elevating shaft 110, three suction disks 130 held on the −Z side surface of the suction holding member 120 so as to be facing the −Z direction, a driving motor 140 for moving (elevating/lowering) the elevating shaft 110 in the Z axis direction, a transmitting system 150 for transmitting the rotary force of the driving motor 140 to the elevating shaft 110, and an adjuster 160 facing the −Z direction held at the center of the −Z side surface of the suction holding member 120.

Furthermore, on the surface of each arm 520 on the −Z side, there is a vacuum pipe connecting the suction disks 130 and a vacuum pump (not shown), and an electromagnetic valve that is provided in the vacuum pipe and that is opened and closed by the control device.

By opening the electromagnetic valve, the suction disks 130 can vacuum-suction the thin optical disks 21 and the spacers 22. By closing the electromagnetic valve, air is guided in the suction disks 130, so that the suctioned state is released.

The laminate elevating mechanism 200 is positioned on the −Z side of the laminate stocker 300. As shown in FIGS. 22A through 24, the laminate elevating mechanism 200 includes an elevating shaft 210 parallel to the Z axis, an adjuster 220 mounted to the +Z end of the elevating shaft 210, a driving motor 230 for moving (elevating and lowering) the elevating shaft 210 in the Z axis direction, and blades 240 (flared portion) disposed on the −Z side of the adjuster 220.

The central axis of the elevating shaft 210 substantially matches the center of the opening in the laminate stocker 300 and the center of the drawn out disk tray 710.

Figure 25:
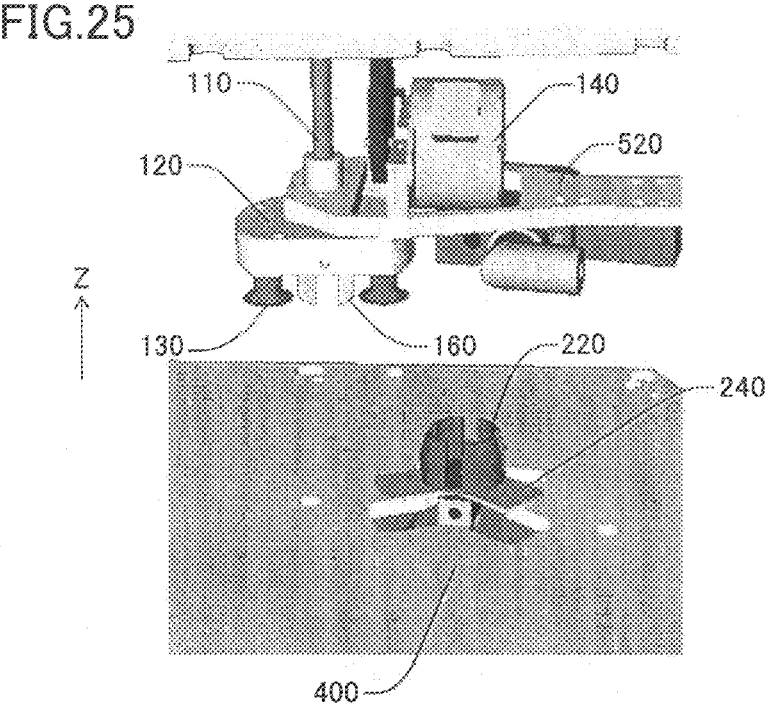
FIG. 25 illustrates the relationship between an adjustor of the suction mechanism and an adjustor of the laminate elevating mechanism.

The adjuster 220 has a shape that fits with the adjuster 160 of the suction mechanism 100 (see FIG. 25). Specifically, the adjuster 220 has notches in which protrusions of the adjuster 160 are inserted.

Furthermore, the edges of the adjuster 220 are tapered.

The maximum outer diameter of the adjuster 220 is set such that the position of the disk laminate 20 in the horizontal direction is specified when the adjuster 220 is inserted into the center hole of the disk laminate 20.

Figure 26:
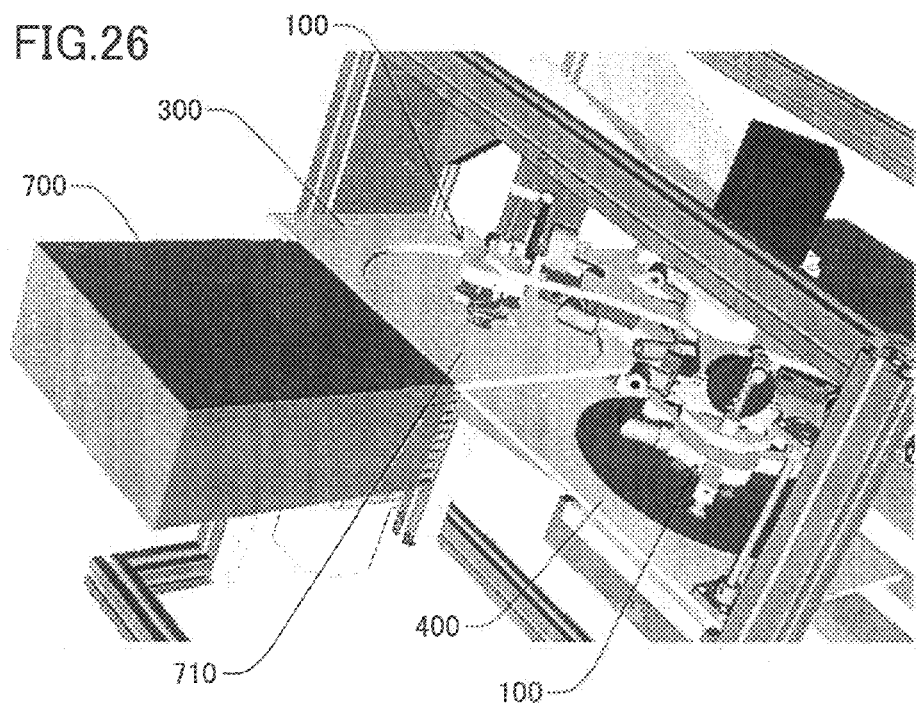
FIG. 26 illustrates a state where the adjustor of the suction mechanism and the adjustor of the laminate elevating mechanism are fit together.
Figure 27:
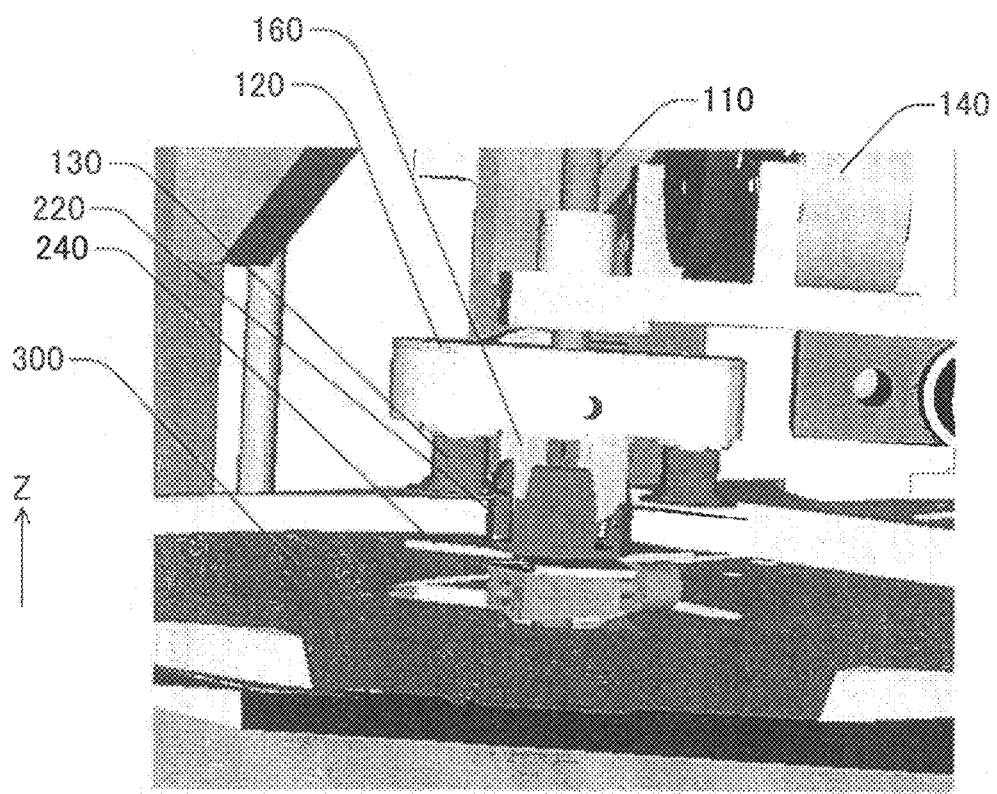
FIG. 27 is a partially enlarged view of FIG. 26.

FIG. 26 illustrates the state where the adjuster 220 and the adjuster 160 are fitted together. FIG. 27 is a partially enlarged view of FIG. 26.

When the elevating shaft 210 is elevated when the disk laminate 20 is placed on the drawn out disk tray 710, the adjuster 220 and the blades 240 are elevated and passed through the opening of the laminate stocker 300 and the notch of the disk tray 710. The adjuster 220 is inserted in the center hole of the disk laminate 20, and the disk laminate 20 is supported by the blades 240. When the elevating shaft 210 is further elevated, the disk laminate 20 is lifted up from the bottom surface of the disk tray 710.

In this case, the thin optical disk 21 and the spacer 22 can be suctioned by the suction mechanism 100 without their positions being displaced in the horizontal direction.

Next, details are given of conveying procedures.

A-2. When Recording or Reproducing is Performed for Thin Optical Sisks 21 Using All Drive Devices 800

Figure 28A:
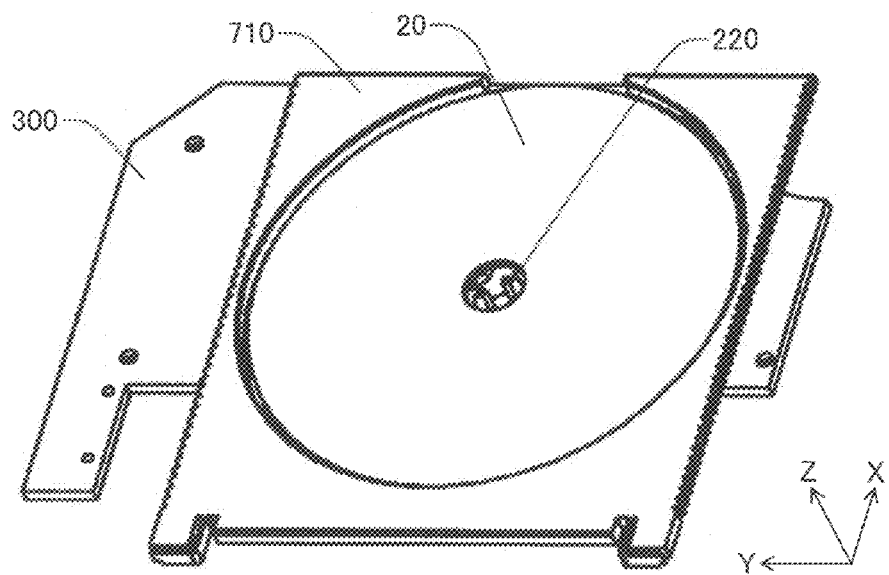
FIGS. 28A and 28B are for illustrating operations of the laminate elevating mechanism and the suction mechanism (part 1)
Figure 28B:
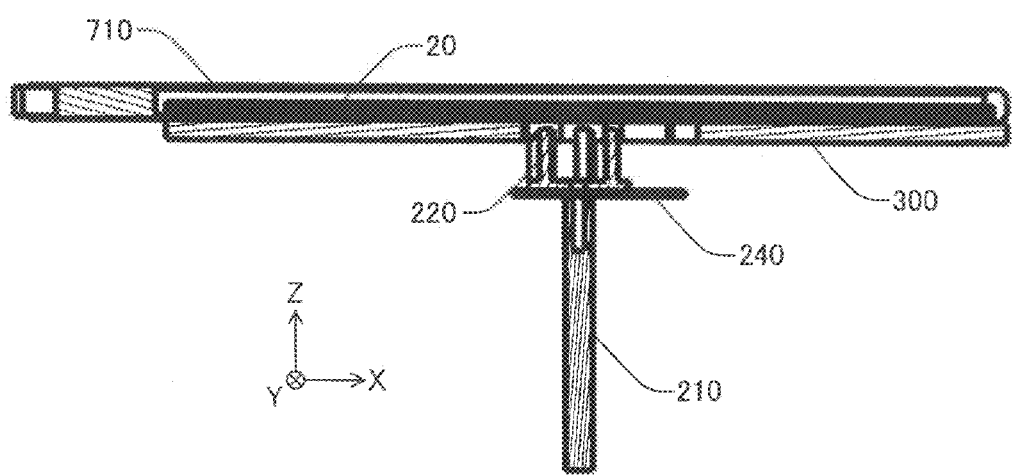
Figure 29A:
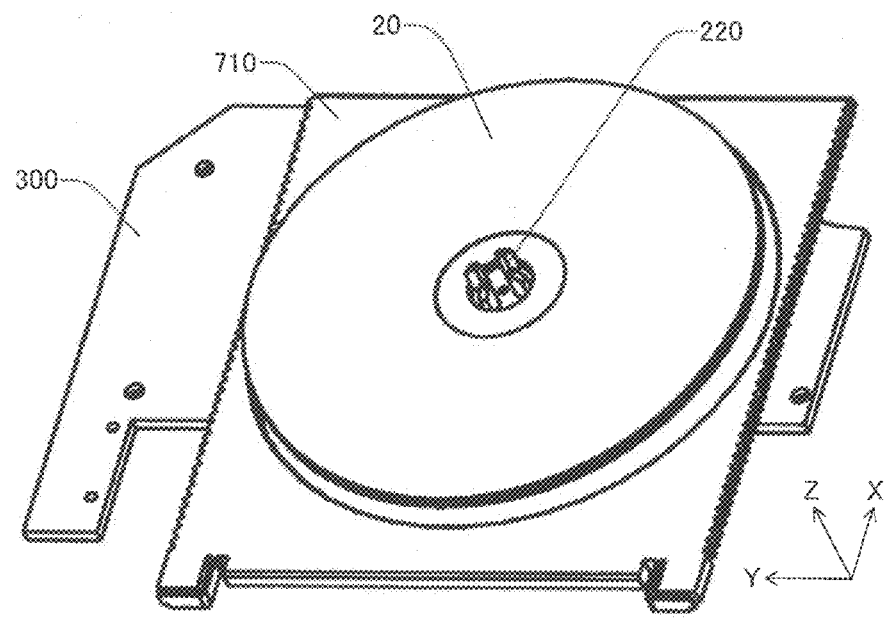
FIGS. 29A and 29B are for illustrating operations of the laminate elevating mechanism and the suction mechanism (part 2)
Figure 29B:
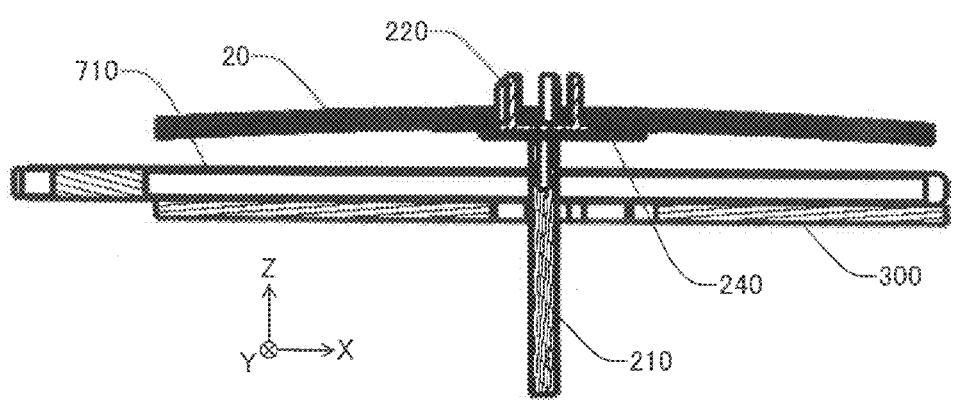
Figure 30A:
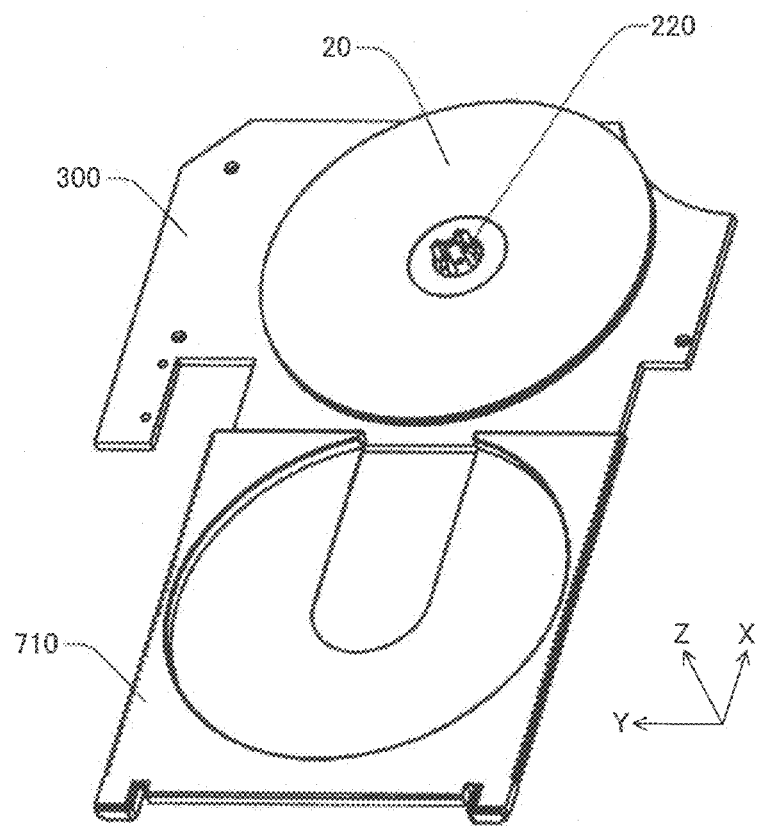
FIGS. 30A and 30B are for illustrating operations of the laminate elevating mechanism and the suction mechanism (part 3)
Figure 30B:
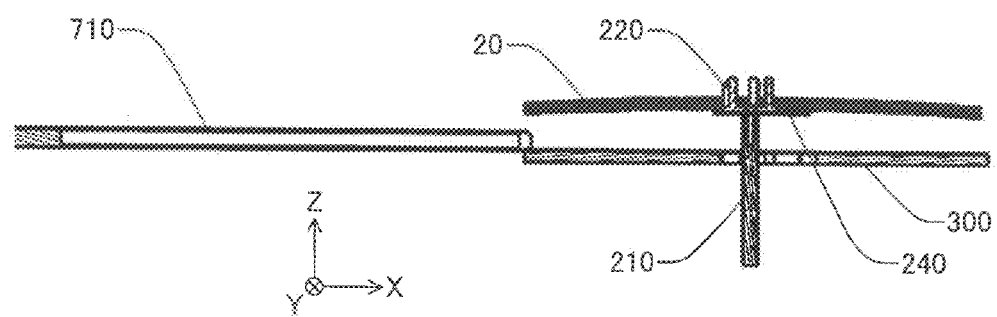
Figure 31A:
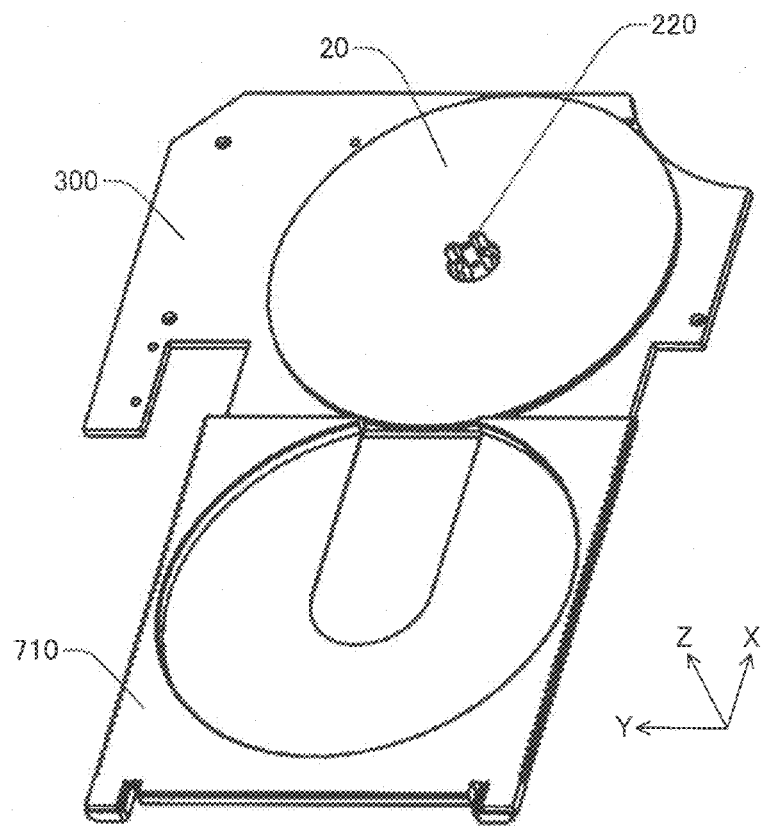
FIGS. 31A and 31B are for illustrating operations of the laminate elevating mechanism and the suction mechanism (part 4)
Figure 31B:
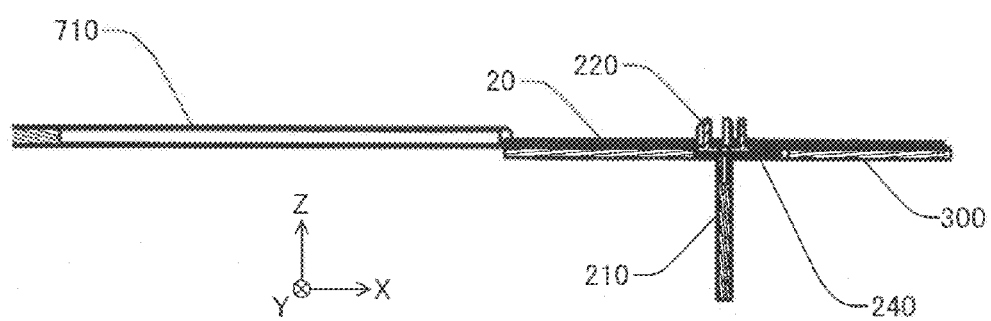
Figure 32A:
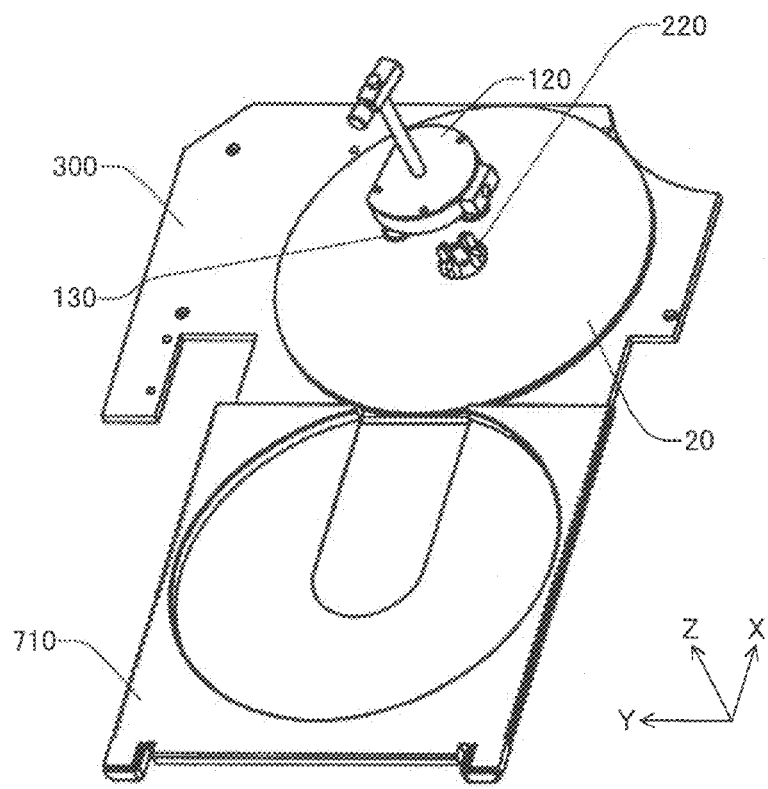
FIGS. 32A and 32B are for illustrating operations of the laminate elevating mechanism and the suction mechanism (part 5)
Figure 32B:
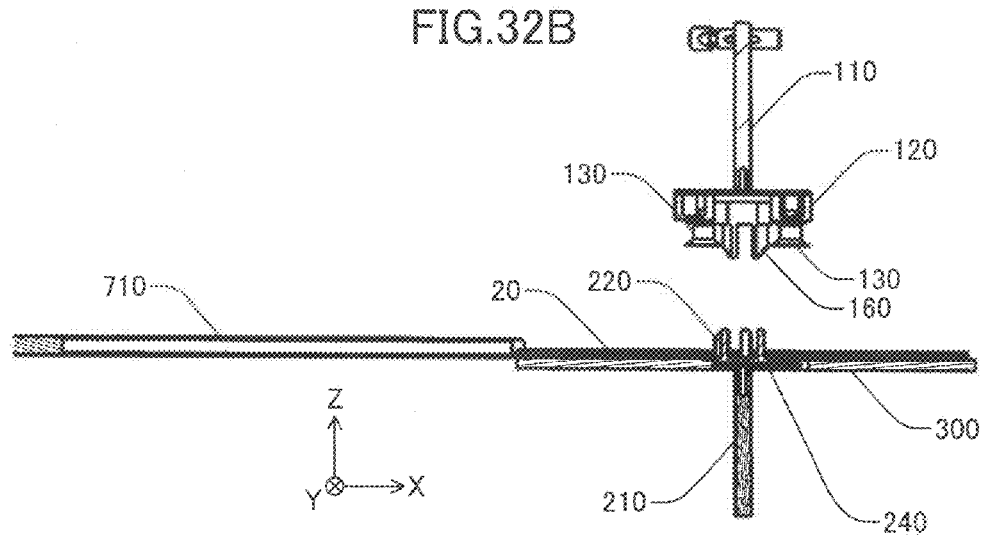
Figure 33A:
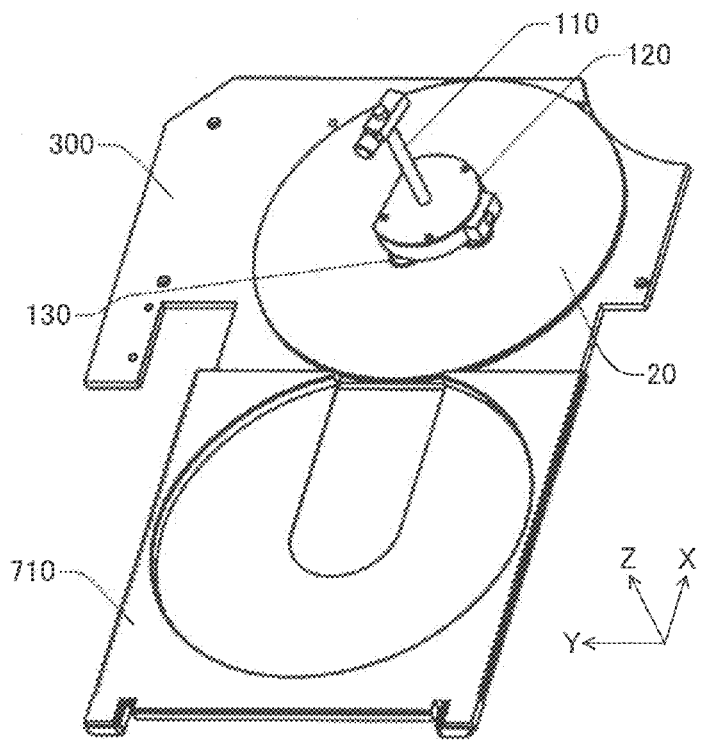
FIGS. 33A and 33B are for illustrating operations of the laminate elevating mechanism and the suction mechanism (part 6)
Figure 33B:
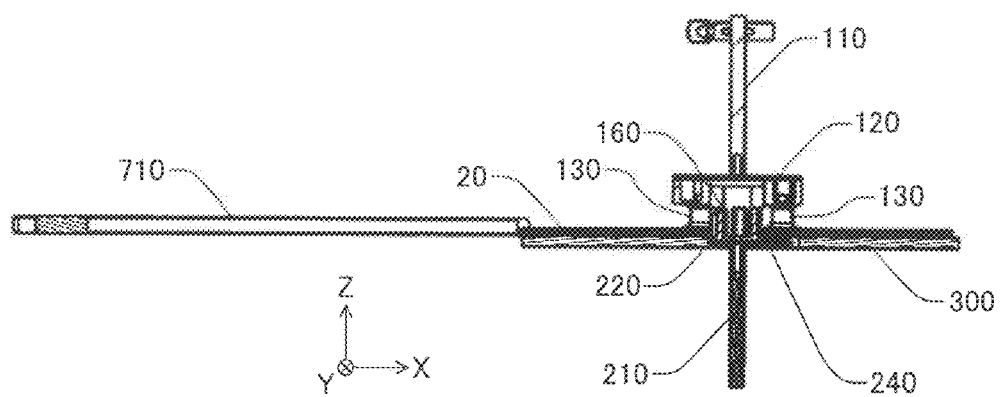
Figure 34A:
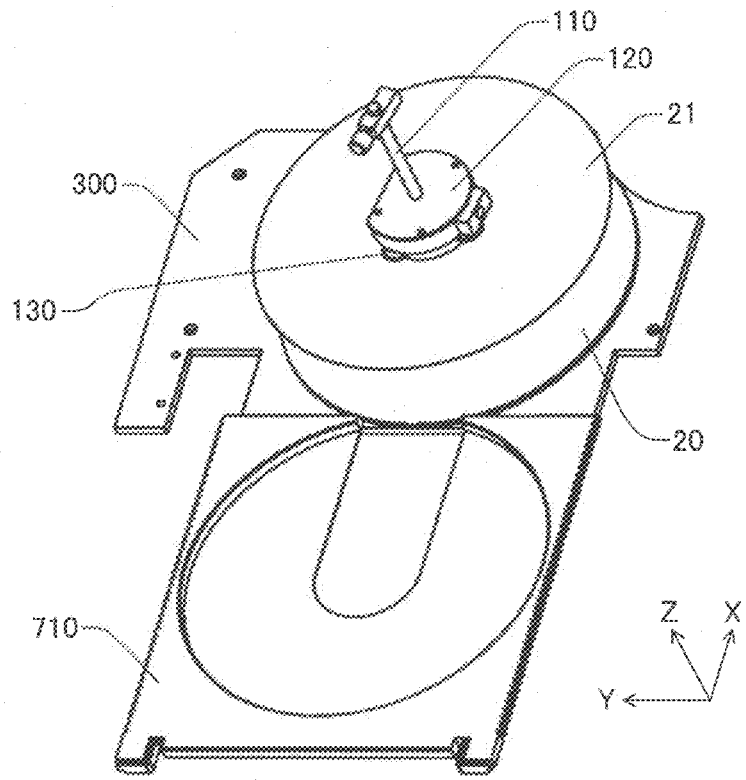
FIGS. 34A and 34B are for illustrating operations of the laminate elevating mechanism and the suction mechanism (part 7)
Figure 34B:
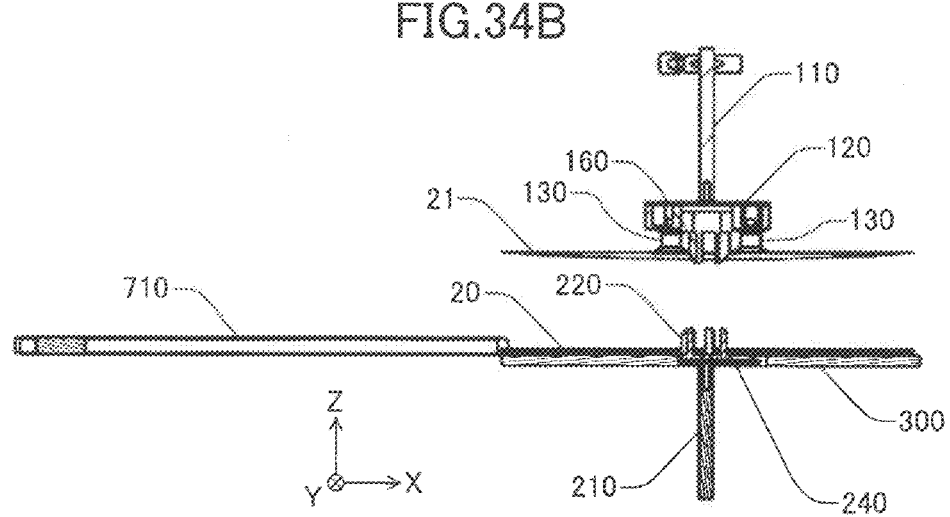

(A1) The disk tray 710 is drawn out from the disk cartridge 700 (see FIGS. 28A and 28B).
(A2) The adjuster 220 and the blades 240 are elevated, and the disk laminate 20 is separated from the disk tray 710 (see FIGS. 29A and 29B). In this case, the edges of the adjuster 220 are tapered, and therefore the disk laminate 20 is aligned into the proper position without damaging the edges of the center hole of the disk laminate 20. Furthermore, the disk laminate 20 is placed on the blades 240, and the adjuster 220 is inserted in the center hole of the disk laminate 20, and therefore the position of disk laminate 20 in the horizontal direction is not displaced.
(A3) The disk tray 710 is put in the disk cartridge 700 (see FIGS. 30A and 30B).
(A4) The adjuster 220 and the blades 240 are slightly lowered, and the disk laminate 20 is placed on the laminate stocker 300 (see FIGS. 31A and 31B). The state where the adjuster 220 is inserted into the center hole of the disk laminate 20 and the disk laminate 20 is placed on the blades 240 is maintained.
(A5) The drive tray 810 is opened.
(A6) Any one of the suction mechanisms 100 is moved to the +Z side of the laminate stocker 300 (see FIGS. 32A and 32B).
(A7) The suction holding member 120 is lowered, and the adjuster 160 and the adjuster 220 are fitted together (see FIGS. 33A and 33B).
(A8) The three suction disks 130 suction the topmost thin optical disk 21 on the disk laminate 20.
(A9) The suction holding member 120 is elevated, and the suctioned thin optical disk 21 is separated from the disk laminate 20 (see FIGS. 34A and 34B). Accordingly, the topmost surface of the disk laminate 20 becomes the spacer 22.
(A10) The suction mechanism 100 suctioning the thin optical disk 21 is moved immediately above the drive tray 810.
(A11) The suction holding member 120 suctioning the thin optical disk 21 is lowered, and the suctioned state is released. Accordingly, the thin optical disk 21 is placed on the drive tray 810.
(A12) The suction holding member 120 is elevated.
(A13) The drive tray 810 is put in the casing of the drive device 800.
(A14) Any one of the suction mechanisms 100 is moved to the +Z side of the laminate stocker 300.
(A15) The suction holding member 120 is lowered, and the adjuster 160 and the adjuster 220 are fitted together.
(A16) The three suction disks 130 suction the topmost spacer 22 on the disk laminate 20.
(A17) The suction holding member 120 is elevated, and the suctioned spacer 22 is separated from the disk laminate 20. Accordingly, the topmost surface of the disk laminate 20 becomes the thin optical disk 21.
(A18) The suction mechanism 100 suctioning the spacer 22 is moved immediately above the spacer stocker 400.
(A19) The suction holding member 120 suctioning the spacer 22 is lowered, and the suctioned state is released. Accordingly, the spacer 22 is placed on the spacer stocker 400.
(A20) The suction holding member 120 is elevated.
(A21) The position of the arms in the Z axis direction is adjusted according to the position of the next drive tray 810 in the Z axis direction.

The processes of (A1) through (A21) are repeatedly performed until the thin optical disks 21 are set in the drive trays 810 of all of the drive devices 800.

Furthermore, recording or reproducing is performed for each of the thin optical disks 21.

B-2. When Recording or Reproducing has Ended, and All Thin Optical Disks 21 are Returned to Disk Cartridge 700

(B1) The position of the arms in the Z axis direction is adjusted according to the position in the Z axis direction of the drive tray 810 located on the furthest +Z side. In this example, the position of the arms in the Z axis is adjusted to be at the topmost stage.
(B2) The drive tray 810 is opened.
(B3) Any one of the suction mechanisms 100 is moved to the +Z side of the drive tray 810.
(B4) The suction holding member 120 is lowered, and the adjuster 160 is fitted into the center hole of the thin optical disk 21 on the drive tray 810.
(B5) The three suction disks 130 suction the thin optical disk 21 on the drive tray 810.
(B6) The suction holding member 120 is elevated, and the suctioned thin optical disk 21 is separated from the drive tray 810.
(B7) The drive tray 810 is put in the casing of the drive device 800.
(B8) The suction mechanism 100 suctioning the thin optical disk 21 is moved immediately above the laminate stocker 300.
(B9) The suction holding member 120 suctioning the thin optical disk 21 is lowered, and the adjuster 160 and the adjuster 220 are fitted together.
(B10) The suction of the suction disks 130 suctioning the thin optical disk 21 is released. Accordingly, the thin optical disk 21 is placed on the blades 240. In this step, the region around the outer periphery of the thin optical disk 21 is placed on the laminate stocker 300.

(B11) The suction holding member 120 is elevated.
(B12) Any one of the suction mechanisms 100 is moved immediately above the spacer stocker 400.
(B13) The suction holding member 120 is lowered, and the adjuster 160 is fitted into the center hole of the spacer 122 on the spacer stocker 400.
(B14) The three suction disks 130 suction the spacer 22 on the spacer stocker 400.
(B15) The suction holding member 120 is elevated, and the suctioned spacer 22 is separated from the spacer stocker 400.
(B16) The suction mechanism 100 suctioning the spacer 22 is moved immediately above the laminate stocker 300.
(B17) The suction holding member 120 suctioning the spacer 22 is lowered, and the adjuster 160 and the adjuster 220 are fitted together.
(B18) The suction of the suction disks 130 suctioning the spacer 22 is released. Accordingly, the spacer 22 is placed on the thin optical disk 21 that is placed on the blades 240.
(B19) The suction holding member 120 is elevated.
(B20) The position of the suction mechanisms 100 in the Z axis direction is adjusted according to the position of the next drive tray 810 in the Z axis direction.

The processes of (B1) through (B20) are repeatedly performed until the thin optical disks 21 on all of the drive trays 810 and all of the spacers 22 on the spacer stocker 400 are placed on the blades 240.

(B21) The disk tray 710 is drawn out from the disk cartridge 700.
(B22) The adjuster 220 is lowered, and the disk laminate 20 is placed on the disk tray 710. The disk laminate 20 can be accurately returned to the disk tray 710.
(B23) The disk tray 710 is put in the disk cartridge 700.

The above operations are programmed, and the program is stored in the ROM of the control device. That is to say, the above operations are executed according to instructions from the control device.

When the thin optical disk 21 or the spacer 22 is conveyed, the adjuster 160 is always passed through the center hole of the thin optical disk 21 or the spacer 22 so that the adjuster 160 is protruding from the center hole. Accordingly, when the thin optical disk 21 and the spacer 22 are unloaded from and loaded to the disk tray 710, the positions of the thin optical disk 21 and the spacer 22 can be prevented from being displaced. Furthermore, the disk tray 710 can be smoothly put in the disk cartridge 700.

When the process of (B4) or (B13) described above is performed, even if the thin optical disk 21 or the spacer 22 is displaced from the position where it is supposed to be located, the tip of the adjuster 160 is tapered, and therefore the displacement can be sufficiently absorbed. Accordingly, the thin optical disk 21 or the spacer 22 can be automatically aligned into the proper position, so that the precision of the center position is maintained.

The adjuster 160 and the adjuster 220 are fit together to be meshed to each other up to their bases. Accordingly, the thin optical disk 21 or the spacer 22 can be passed between the suction mechanism 100 and the laminate elevating mechanism 200, with the center position maintained at a predetermined position.

As described above, in the thin disk recording/reproducing device 10 according to the present embodiment, a disk unloading/loading mechanism according to an embodiment of the present invention includes four suction mechanisms 100 and the laminate elevating mechanism 200.

The disk conveying device according to an embodiment of the present invention includes the four suction mechanisms 100, the laminate elevating mechanism 200, the laminate stocker 300, the spacer stocker 400, and the revolution conveying motor 500.

As described above, the thin disk recording/reproducing device 10 according to the present embodiment includes the disk cartridge 700, ten drive devices 800, four suction mechanisms 100, the laminate elevating mechanism 200, the laminate stocker 300, the spacer stocker 400, and the revolution conveying motor 500.

The disk cartridge 700 stores plural thin optical disks 21 with the spacers 22 provided therebetween.

The laminate stocker 300 is where the disk laminate 20 is placed and temporarily stored. The spacer stocker 400 is where the spacers 22 are placed and temporarily stored.

The laminate elevating mechanism 200 is disposed on the −Z side of the laminate stocker 300, and includes the elevating shaft 210 parallel to the Z axis, the adjuster 220 mounted to the +Z side end of the elevating shaft 210, the driving motor 230 for moving (elevating and lowering) the elevating shaft 210 in the Z axis direction, and the blades 240 that are disposed on the −Z side of the adjuster 220.

The four suction mechanisms 100 are respectively mounted to parts around the ends of the four arms 520 that are mutually orthogonal. The other ends of the arms 520 are fixed to the rotational shaft 510 of the revolution conveying motor 500.

Each of the suction mechanisms 100 includes the elevating shaft 110 that is parallel to the Z axis, the block-type suction holding member 120 mounted to the −Z end of the elevating shaft 110, three suction disks 130 facing the −Z direction held on the −Z side surface of the suction holding member 120, the driving motor 140 for moving (elevating and lowering) the elevating shaft 110 in the Z axis direction, the transmitting system 150 for transmitting the rotary force of the driving motor 140 to the elevating shaft 110, and the adjuster 160 facing the −Z direction held at the center of the −Z side surface of the suction holding member 120.

Accordingly, the disk laminate 20 placed on the disk tray 710 can be unloaded from the disk tray 710 while maintaining the position of the disk tray 710 in the horizontal direction. The suction mechanism 100 can suction the thin optical disk 21 or the spacer 22 from the disk laminate 20 and hold the thin optical disk 21 or the spacer 22, while maintaining the position of the thin optical disk 21 or the spacer 22 in the horizontal direction.

Furthermore, the suction mechanism 100 can suction the thin optical disk 21 placed on the drive tray 810 or the spacer 22 placed on the spacer stocker 400, while maintaining the position of the thin optical disk 21 or the spacer 22 in the horizontal direction.

Furthermore, the thin optical disk 21 and the spacer 22 can be conveyed and placed somewhere while precisely maintaining their positions to which they are accurately aligned.

Thus, the thin optical disk 21 can be unloaded from and loaded into the disk cartridge 700 with high positional precision. Furthermore, the thin optical disk 21 can be conveyed between the disk cartridge 700 and the drive device 800 with high positional precision.

As described above, with the disk unloading/loading mechanism according to an embodiment of the present invention, thin disks can be unloaded from/loaded into a disk cartridge with high positional precision. Furthermore, with the disk conveying device according to an embodiment of the present invention, thin disks can be conveyed with high positional precision.

Figure 35:
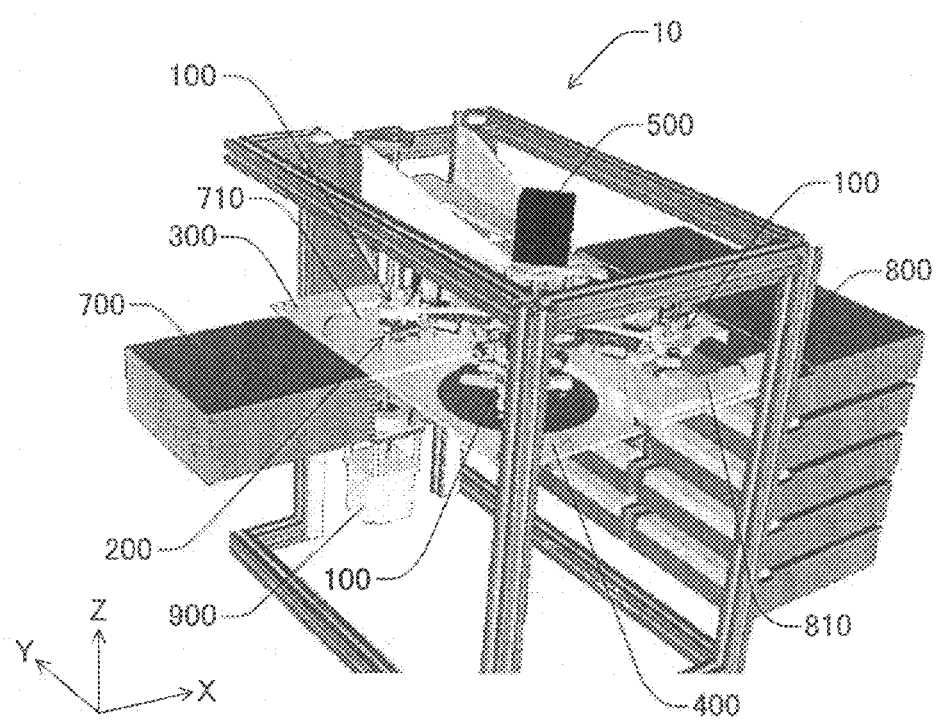
FIG. 35 illustrates a thin disk recording/reproducing device according to an embodiment of the present invention.

FIG. 35 illustrates a thin disk recording/reproducing device (referred to disk changer in FIG. 1) 10 functioning as a thin disk driving system according to an embodiment of the present invention. The thin disk recording/reproducing device 10 is similar to that of FIG. 17. Elements corresponding to those of FIG. 17 are denoted by the same reference numerals, and are not further described. A driving motor 900 (described below) is indicated in FIG. 35.

Figure 36:
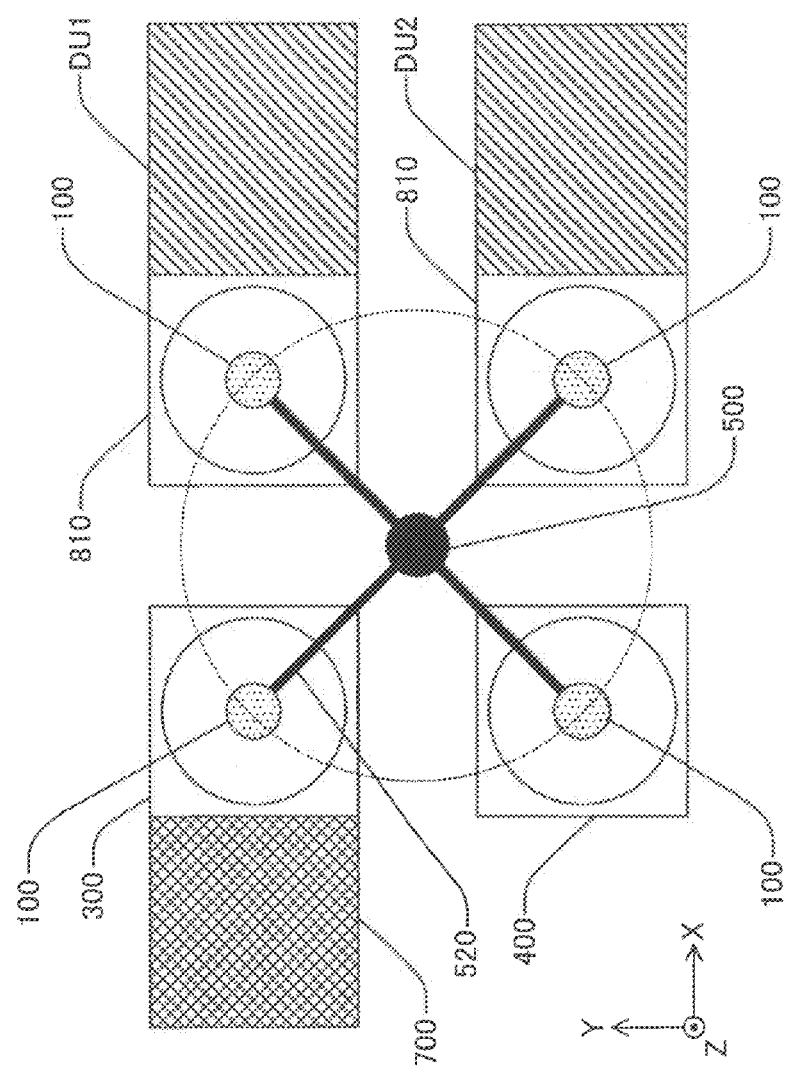
FIG. 36 illustrates the positional relationships between a laminate stocker, a spacer stocker, an open drive tray, and a revolution conveying motor.
Figure 37:
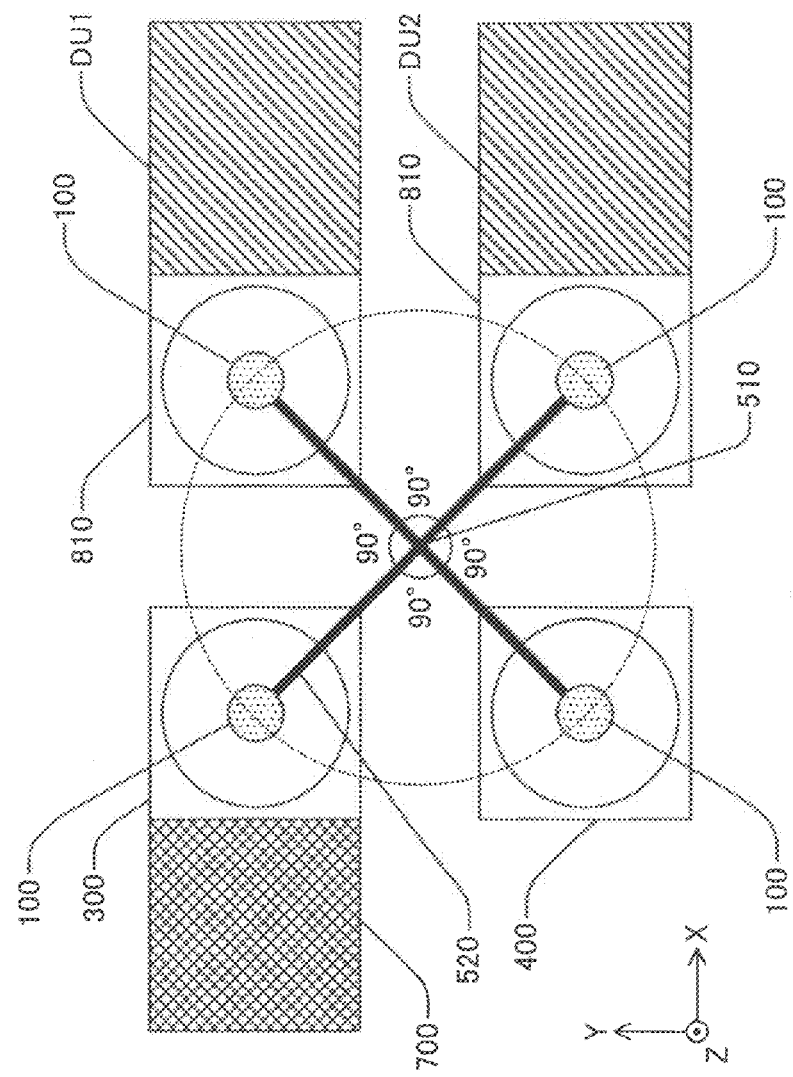
FIG. 37 illustrates the positional relationships between a laminate stocker, a spacer stocker, an open drive tray, and a suction mechanism.

Furthermore, in the thin disk recording/reproducing device 10 illustrated in FIG. 35, as shown in FIGS. 36 and 37, the rotational shaft 510 of the revolution conveying motor 500 is provided at a position such that the center of the disk laminate 20 placed on the laminate stocker 300, the center of the spacer 22 placed on the spacer stocker 400, the center of the drive tray 810 drawn out from the drive device 800 of the drive unit DU1 (hereinafter, also referred to as "open drive tray" as a matter of convenience), and the center of the drive tray drawn out from the drive device 800 of the drive unit DU2, are arranged along the same circumference centered at the rotational shaft 510 in the XY plane, with intervals of equal center angles (hereinafter, also referred to as "arrangement center angles" as a matter of convenience).

The four arms 520 are disposed at equal center angles to each other (hereinafter, also referred to as "arm center angles" as a matter of convenience), which are the same as the arrangement center angles described above. Therefore, when one of the suction mechanisms 100 is positioned on the +Z side of the center of the disk laminate 20 placed on the laminate stocker 300, the other three suction mechanisms 100 are respectively positioned on the +Z side of the center of the spacer 22 placed on the spacer stocker 400, and the +Z side of the centers of the two drive trays 810.

The suction holding member 120 can be moved (elevated and lowered) by the driving motor 140.

Next, details are given of conveying procedures.

A-3. When Recording or Reproducing is Performed for Thin Optical Disks 21 Using All Drive Devices 800

(A1) The disk tray 710 is drawn out from the disk cartridge 700.

(A2) The adjuster 220 is elevated, and the disk laminate 20 is separated from the disk tray 710.

(A3) The disk tray 710 is put in the disk cartridge 700.

(A4) The adjuster 220 is lowered, and the disk laminate 20 is placed on the laminate stocker 300. Here, the center position of the disk laminate 20 in the XY plane is the same as the center position of the disk laminate 20 when the disk laminate 20 is placed on the disk tray 710.

(A5) The drive trays 810 of the drive unit DU1 and the drive unit DU2 are drawn out.

(A6) Any one of the suction mechanisms 100 is moved to the +Z side of the laminate stocker 300.

(A7) The suction holding member 120 is lowered, and the three suction disks 130 suction the topmost thin optical disk 21 on the disk laminate 20.

(A8) The suction holding member 120 is elevated, and the suctioned thin optical disk 21 is separated from the disk laminate 20. Accordingly, the topmost surface of the disk laminate 20 becomes the spacer 22.

(A9) The suction mechanism 100 suctioning the thin optical disk 21 is moved immediately above the drive tray 810.

(A10) The suction holding member 120 suctioning the thin optical disk 21 is lowered, and the suctioned state is released. Accordingly, the thin optical disk 21 is placed on the drive tray 810.

(A11) The suction holding member 120 is elevated.

(A12) The drive tray 810 is put in the casing of the drive device 800.

(A13) Any one of the suction mechanisms 100 is moved to the +Z side of the laminate stocker 300.

(A14) The suction holding member 120 is lowered, and the three suction disks 130 suction the topmost spacer 22 on the disk laminate 20.

(A15) The suction holding member 120 is elevated, and the suctioned spacer 22 is separated from the disk laminate 20. Accordingly, the topmost surface of the disk laminate 20 becomes the thin optical disk 21.

(A16) The suction mechanism 100 suctioning the spacer 22 is moved immediately above the spacer stocker 400.

(A17) The suction holding member 120 suctioning the spacer 22 is lowered, and the suctioned state is released. Accordingly, the spacer 22 is placed on the spacer stocker 400.

(A18) The suction holding member 120 is elevated.

(A19) The processes of (A6) through (A18) are repeated for the other drive unit.

(A20) The position of the arms in the Z axis direction is adjusted according to the position of the next drive tray 810 in the Z axis direction. The suction mechanisms 100, the laminate elevating mechanism 200, the laminate stocker 300, the spacer stocker 400, and the revolution conveying motor 500 are integrated in a single structure, and are simultaneously driven in the Z axis direction by the driving motor 900 (see FIG. 35).

The processes of (A5) through (A20) are repeatedly performed until the thin optical disks 21 are set in the drive trays 810 of all of the drive devices 800.

Recording or reproducing is performed for each of the thin optical disks 21.

B-3. When Recording or Reproducing Has Ended, and All Thin Optical Disks 21 are Returned to Disk cartridge 700

(B1) The position of the arms in the Z axis direction is adjusted according to the position in the Z axis direction of the drive tray 810 located on the furthest +Z side. In this example, the position of the arms in the Z axis is adjusted to be at the topmost stage.

(B2) The drive trays 810 of the drive unit DU1 and the drive unit DU2 are opened.

(B3) Any one of the suction mechanisms 100 is moved to the +Z side of the drive tray 810.

(B4) The suction holding member 120 is lowered, and the three suction disks 130 suction the thin optical disk 21 on the drive tray 810.

(B5) The suction holding member 120 is elevated, and the suctioned thin optical disk 21 is separated from the drive tray 810.

(B6) The drive tray 810 is put in the casing of the drive device 800.

(B7) The suction mechanism 100 suctioning the thin optical disk 21 is moved immediately above the laminate stocker 300.

(B8) The suction holding member 120 suctioning the thin optical disk 21 is lowered, and the suctioned state is released. Accordingly, the thin optical disk 21 is placed on the laminate stocker 300.

(B9) The suction holding member 120 is elevated.

(B10) Any one of the suction mechanisms 100 is moved immediately above the spacer stocker 400.

(B11) The suction holding member 120 is lowered, and the three suction disks 130 suction the spacer 22 on the spacer stocker 400.

(B12) The suction holding member 120 is elevated, and the suctioned spacer 22 is separated from the spacer stocker 400.

(B13) The suction mechanism 100 suctioning the spacer 22 is moved immediately above the laminate stocker 300.

(B14) The suction holding member 120 suctioning the spacer 22 is lowered, and the vacuum state is released. Accordingly, the spacer 22 is placed on the laminate stocker 300.

(B15) The suction holding member 120 is elevated.

(B16) The processes of (B3) through (B15) are repeated for the other drive unit.

(B17) The position of the arms in the Z axis direction is adjusted according to the position of the next drive tray 810 in the Z axis direction.

The processes of (B2) through (B17) are repeatedly performed until the thin optical disks 21 on all of the drive trays 810 and all of the spacers 22 on the spacer stocker 400 are placed on the laminate stocker 300.

(B18) The adjuster 220 is elevated, and the disk laminate 20 on the laminate stocker 300 is separated from the laminate stocker 300.

(B19) The disk tray 710 is drawn out from the disk cartridge 700.

(B20) The adjuster 220 is lowered, and the disk laminate 20 is placed on the disk tray 710.

(B21) The disk tray 710 is put in the disk cartridge 700.

The above operations are programmed, and the program is stored in the ROM of the control device. That is to say, the above operations are executed according to instructions from the control device.

As shown in FIGS. 36 and 37, the rotational shaft 510 of the revolution conveying motor 500 is provided at a position such that the center of the disk laminate 20 placed on the laminate stocker 300, the center of the spacer 22 placed on the spacer stocker 400, the center of the open drive tray 810 of the drive unit DU1, and the center of the open drive tray of the drive unit DU2, are arranged along the same circumference centered at the rotational shaft 510 in the XY plane, with intervals of equal arrangement center angles (90 degrees). The four arms 520 are disposed at equal arm center angles to each other which are the same as the arrangement center angles described above.

In this case, the suction mechanisms 100 can be simultaneously positioned immediately above the laminate stocker 300, the spacer stocker 400, and the two open drive trays 810. Accordingly, the operation of suctioning the thin optical disk 21 or the spacer 22 from the laminate stocker 300, and the operation of placing the thin optical disk 21 on the drive tray 810 or the operation of placing the spacer 22 on the spacer stocker 400, can be simultaneously performed.

As described above, by performing plural operations simultaneously, the overall conveying time can be reduced. Furthermore, the suction mechanisms 100 can be moved by the rotation of the rotational shaft 510, and therefore the suction mechanisms 100 can be moved at a relatively high speed.

Furthermore, plural drive devices are stacked into two stacks, and therefore the overall system can be made compact. Accordingly, it is possible to increase the conveying speed as well as reduce the size of the system.

The following discusses the operation of distributing ten thin optical disks stored in the disk cartridge, to ten drive devices, and then returning the thin optical disks to the disk cartridge.

Figure 38:
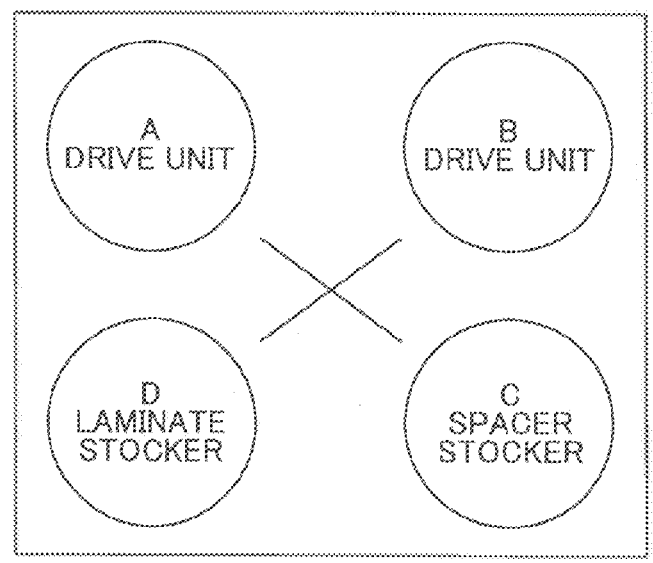
FIG. 38 is for describing operations of the disk conveying mechanism (part 1)
Figure 39:
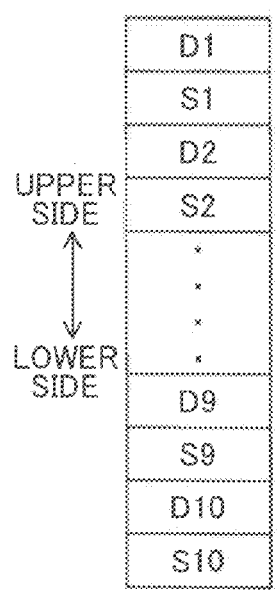
FIG. 39 is for describing operations of the disk conveying mechanism (part 2)

As shown in FIG. 38, two drive units, a spacer stocker, and a laminate stocker are respectively denoted by A, B, C, and D. As shown in FIG. 39, in the laminate, a thin optical disk 1 (D1), a spacer 1 (S1), a thin optical disk 2 (D2), a spacer 2(S2), . . . , a spacer 9 (S9), a thin optical disk 10 (D10), a spacer 10 (S10) are laminated from the upper side to the lower side.

As shown in FIGS. 40, D1, D3, D5, D7, and D9 are distributed to the drive devices in the drive unit A, and D2, D4, D6, D8, and D10 are distributed to the drive devices in the drive unit B. The drive trays of the drive unit A are referred to as drive tray 1, drive tray 3, drive tray 5, drive tray 7, and drive tray 9 from the top tray in the stated order. The drive trays of the drive unit B are referred to as drive tray 2, drive tray 4, drive tray 6, drive tray 8, and drive tray 10 from the top tray in the stated order.

A first operation example is illustrated in FIGS. 41 through 43. FIG. 41 illustrates the movements of the suction mechanism, the movements of the thin optical disks, and the movements of the spacers, when the thin optical disks are conveyed from the disk cartridge to the drive devices. The arrow "↑" in the figures indicates that the corresponding element is suctioned/elevated by the suction mechanism, and the arrow "↓" in the figures indicates that the corresponding element is released from suction/falls. In FIG. 41 and other similar figures, "+" indicates that a rotation in the counterclockwise direction. The rotational angles and the positions of the arm in the operation of FIG. 41 are indicated in FIG. 42. In FIG. 42, the thick black frame on the right side indicates A, B, C, and D of FIG. 38 and their movements at the respective positions.

It is assumed that the disk tray is drawn out from the disk cartridge (open). Furthermore, it is assumed that the position of the arm in the Z axis direction is at the topmost stage.

(Operation 1) The drive tray 1 and the drive tray 2 are drawn out (open).

(Operation 2) The thin optical disk D1 is suctioned.

(Operation 3) The arm is rotated by +90°, and the spacer S1 is suctioned. The thin optical disk D1 is positioned immediately above C (spacer stocker).

(Operation 4) The arm is further rotated by +90° (rotational position is at +180°), and the spacer S1 is placed on the above C (spacer stocker), and the thin optical disk D2 is suctioned. The thin optical disk D1 is positioned immediately above B (drive tray 2).

(Operation 5) The arm is further rotated by +90° (rotational position is at +270°), and the thin optical disk D1 is placed on the drive tray 1, and the spacer S2 is suctioned. The thin optical disk D2 is positioned immediately above C (spacer stocker).

(Operation 6) The arm is further rotated by +90° (rotational position is at +360°), and the thin optical disk D2 is placed on B (drive tray 2), and the spacer S2 is placed on C (spacer stocker).

(Operation 7) The drive tray 1 and the drive tray 2 are put into the drive devices (close).

(Operation 8) The arm is rotated by −360°. This is done so that the rotation of the arm does not twist the pipe (not shown—required for the suction mechanism 100) extending from the vacuum pump (not shown) to the suction mechanism 100, or the electric wiring extending from the driving circuit of the driving motor 900.

(Operation 9) The position of the arm in the Z axis direction is lowered by one stage (DOWN).

Thereafter, the remaining eight thin optical disks are respectively distributed to the eight drive devices in a similar manner as described above.

FIG. 43 illustrates the movements of the suction mechanism, the movements of the thin optical disks, and the movements of the spacers, when the thin optical disks are returned to the disk cartridge from the drive devices.

It is assumed that the disk tray is drawn out from the disk cartridge (open). Furthermore, it is assumed that the position of the arm in the Z axis direction is at the bottommost stage.

(Operation 1) The rotational position of the arm is 0°.

(Operation 2) The arm starts to rotate.
(Operation 3) The drive tray 9 and the drive tray 10 are drawn out (open).
(Operation 4) When the rotational position of the arm becomes 360°, the thin optical disk D10 on B (drive tray 10) is suctioned, and the spacer S10 on C (spacer stocker) is suctioned.
(Operation 5) The arm is further rotated by −90° (rotational position is at +270°), and the thin optical disk D9 on A (drive tray 9) is suctioned, and the spacer S10 is placed on D (laminate stocker).
(Operation 6) The arm is further rotated by −90° (rotational position is at +180°), and the spacer S9 on C (spacer stocker) is suctioned, and the thin optical disk D10 is placed on D (laminate stocker).
(Operation 7) The arm is further rotated by −90° (rotational position is at +90°), and the spacer S9 is placed on D (laminate stocker).
(Operation 8) The arm is further rotated by −90° (rotational position is at 0°), and the thin optical disk D9 is placed on D (laminate stocker).
(Operation 9) The drive tray 9 and the drive tray 10 are put into the drive devices (close).
(Operation 10) The position of the arm in the Z axis direction is elevated by one stage (UP).
Thereafter, the remaining eight thin optical disks and the remaining eight spacers are placed on D (laminate stocker) in a similar manner as described above.
(Operation 46) The laminate placed on D (laminate stocker) is moved to the disk tray, and the disk tray is put in the disk cartridge (close). Then, the operation returns to the initial state.

In this case, the maximum rotational angle of the arm is within 360°, and therefore electric wirings and pipes can be easily connected to the arm, the operations are performed at high speed with minimal acceleration/deceleration and with high positioning precision, the operation flow is simple and the algorithm is plain, it is easy to return to the original point, it is easy to respond to cases where the disk drops or failures occur, various operations can be simultaneously handled while the suction mechanism returns, and the suction mechanism for disks and the suction mechanism for spacers can be separately handled.

A second operation example is illustrated in FIGS. 44 and 45. FIG. 44 illustrates the movements of the suction mechanism, the movements of the thin optical disks, and the movements of the spacers, when the thin optical disks are conveyed from the disk cartridge to the drive devices.
(Operation 1) The drive tray 1 and the drive tray 2 are drawn out (open).
(Operation 2) The thin optical disk D1 is suctioned.
(Operation 3) The arm is rotated by −90°, and the thin optical disk D1 is placed on the drive tray 1.
(Operation 4) The arm is further rotated by −180° (rotational position is at −270°), and the spacer S1 is suctioned.
(Operation 5) The arm is further rotated by +90° (rotational position is at −180°), and the thin optical disk D2 is suctioned and the spacer S1 is placed on C (spacer stocker).
(Operation 6) The arm is further rotated by +90° (rotational position is at −90°), and the spacer S2 is suctioned. The thin optical disk D2 is positioned immediately above C (spacer stocker).
(Operation 7) The arm is further rotated by +90° (rotational position is at 0°), and the spacer S2 is placed on C (spacer stocker), and the thin optical disk D2 is placed on B (drive tray 2).
(Operation 8) The drive tray 1 and the drive tray 2 are put into the drive devices (close).
(Operation 9) The drive tray 3 and the drive tray 4 are drawn out (open).
(Operation 10) The position of the arm in the Z axis direction is lowered by one stage (DOWN).
Thereafter, the remaining eight thin optical disks are respectively distributed to the eight drive devices in a similar manner as described above.

FIG. 45 illustrates the movements of the suction mechanism, the movements of the thin optical disks, and the movements of the spacers, when the thin optical disks are returned to the disk cartridge from the drive devices. The initial rotational position of the arm is at 0°.
(Operation 1) The drive tray 9 and the drive tray 10 are drawn out (open).
(Operation 2) The thin optical disk D10 on B (drive tray 10) is suctioned and the spacer S10 on C (spacer stocker) is suctioned.
(Operation 3) The arm is further rotated by −90° (rotational position is at −90°), and the spacer S10 is placed on D (laminate stocker).
(Operation 4) The arm is further rotated by −90° (rotational position is at −180°), and the spacer S9 on C (spacer stocker) is suctioned and the thin optical disk D10 is placed on D (laminate stocker).
(Operation 5) The arm is further rotated by −90° (rotational position is at −270°), and the thin optical disk D9 on A (drive tray 9) is suctioned and the spacer S9 is placed on D (laminate stocker).
(Operation 6) The arm is further rotated by +90° (rotational position is at −180°), and the thin optical disk D9 is placed on D (laminate stocker).
(Operation 7) The drive tray 9 and the drive tray 10 are put into the drive devices (close).
(Operation 8) The position of the arm in the Z axis direction is elevated by one stage (UP).
(Operation 9) The arm is brought to a rotational position of 0°.
Thereafter, the remaining eight thin optical disks and the remaining eight spacers are placed on D (laminate stocker) a similar manner as described above.
(Operation 45) The laminate placed on D (laminate stocker) is moved to the disk tray, and the disk tray is put in the disk cartridge (close). Then, the operation returns to the initial state.

In this case, the maximum rotational angle of the arm is within 270°, and therefore electric wirings and pipes can be easily connected to the arm, the operations are performed at high speed with minimal acceleration/deceleration and with high positioning precision, and the thin optical disk does not move between drive trays so that the drive trays can be drawn out by a short length.

A third operation example is illustrated in FIG. 46. In this case, odd-numbered thin optical disks are placed on the drive tray of the drive unit DU2, and even-numbered thin optical disks are placed on the drive tray of the drive unit DU1.
(Operation 1) The thin optical disk D1 is suctioned.
(Operation 2) The arm is rotated by +90°, and the spacer S1 is suctioned.
(Operation 3) The arm is further rotated by +90° (rotational position is at +180°, and the thin optical disk D1 is placed on the drive tray 2. At the same time, the thin optical disk D2 is suctioned, and the spacer S1 is placed on C (spacer stocker).
(Operation 4) The arm is further rotated by −90° (rotational position is at +90°), and the spacer S2 is suctioned, and the thin optical disk D2 is placed on the drive tray 1.

(Operation 5) The arm is further rotated by +90° (rotational position is at +180°), and the spacer S2 is placed on C (spacer stocker), and the thin optical disk D3 is suctioned.
(Operation 6) The arm is rotated by +90° (rotational position is at +270°), and the spacer S3 is suctioned.

The operations of putting the drive tray 1 and the drive tray 2 into the drive devices (close), and lowering the position of the arm in the Z axis direction by one stage (DOWN) are performed while (Operation 5) or (Operation 6) is being performed.

Thereafter, the remaining eight thin optical disks are respectively distributed to the eight drive devices in a similar manner as described above.

In this case, the operations of rotating the arm by −90° are appropriately inserted, and therefore while minimizing the increase in the number of overall steps, operations can be stably performed by constantly rotating the arm by +90° or −90°, and the and the thin optical disk does not move between drive trays so that the drive trays can be drawn out by a short length.

A fourth operation example is illustrated in FIG. 47. In this case, the operations of rotating the arm by −90° and −270° are appropriately inserted, and therefore while minimizing the increase in the number of overall steps, the maximum rotational angle of the arm can be made within 270°. Therefore, electric wirings and pipes can be easily connected to the arm.

A fifth operation example is illustrated in FIG. 48. In this case, the operations of rotating the arm by −90°, −180°, and −360° are appropriately inserted, and therefore while minimizing the increase in the number of overall steps, the maximum rotational angle of the arm can be made within 270°. Therefore, electric wirings and pipes can be easily connected to the arm, the suction mechanism is not holding anything when the arm is rotated in the reverse direction and thus high-speed rotation is possible, and the thin optical disk 21 does not move between drive trays so that the drive trays can be drawn out by a short length.

A sixth operation example is illustrated in FIG. 49. In this case, the arm is constantly moving in one direction by 90°, and therefore only the simplest algorithm is required.

As described above, in the thin disk recording/reproducing device 10 according to the present embodiment, the disk conveying mechanism includes four suction mechanisms 100, the laminate elevating mechanism 200, the laminate stocker 300, the spacer stocker 400, and the revolution conveying motor 500.

As described above, the thin disk recording/reproducing device 10 according to the present embodiment includes the disk cartridge 700, ten drive devices 800, and the disk conveying mechanism.

The disk cartridge 700 stores plural thin optical disks 21 with spacers 22 provided therebetween.

On the laminate stocker 300, the disk laminate 20 including plural thin optical disks 21 and plural spacers 22 is placed and temporarily stored. On the spacer stocker 400 the spacers are placed and temporarily stored. The laminate elevating mechanism 200 moves the disk laminate 20 between the disk tray 710 and the laminate stocker 300. Each of the four suction mechanisms 100 is mounted to an end of one of the four arms. The other ends of the arms are fixed to the rotational shaft 510 of the revolution conveying motor 500.

The center of the laminate stocker 300, the center of the spacer stocker 400, and the centers of the open drive trays are arranged along the same circumference in the XY plane with intervals of equal center angles, centered at the rotational shaft 510 of the revolution conveying motor 500.

In this case the four suction mechanisms 100 can be simultaneously positioned above the center of the laminate stocker 300, above the center of the spacer stocker 400, and above the centers of the open drive trays.

Accordingly, it is possible to simultaneously perform suctioning or suction-releasing of the thin optical disk 21 or the spacer 22 at the laminate stocker 300, suctioning or suction-releasing of the thin optical disks 21 at the open drive trays, and suctioning or suction-releasing of the spacer 22 at the spacer stocker 400.

As described above, by performing plural operations simultaneously, the overall conveying time can be reduced. Furthermore, the suction mechanisms 100 move in the horizontal direction by the rotation of the rotational shaft 510, and thus can be moved at a relatively high speed, and the overall system can be made compact. That is to say, it is possible to increase the speed of conveying operations as well as reducing the size of the system.

In the above embodiment, the thin optical disks 21 and the spacers 22 are retrieved from the disk tray 710 and put on the laminate stocker 300 at once, and are then conveyed from the laminate stocker 300 one by one; however, the present invention is not so limited. For example, the thin optical disks 21 and the spacers 22 may be directly conveyed from the disk tray 710 to the drive tray 810 and the spacer stocker 400. In this case, the disk tray 710 also acts as the laminate stocker 300.

Figure 50:
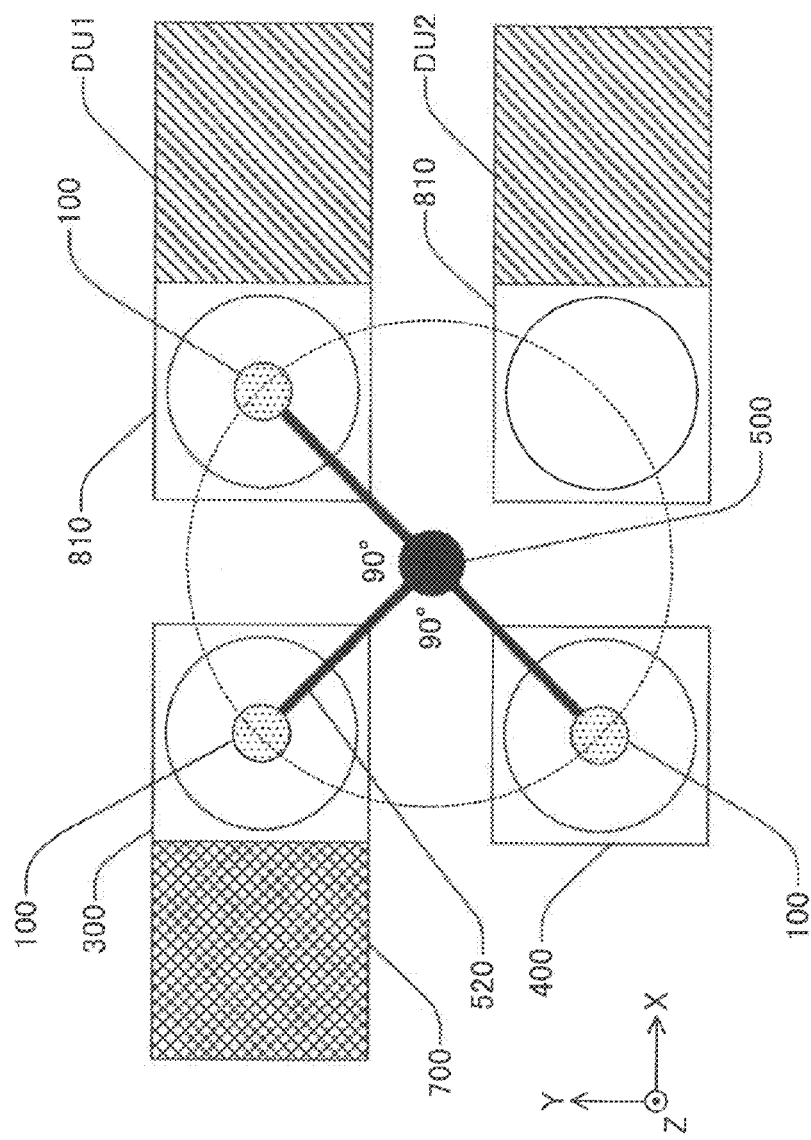
FIG. 50 illustrates a modification of the disk conveying mechanism.

Furthermore, in the above embodiment, there are four suction mechanisms 100; however, the present invention is not so limited. For example, as shown in FIG. 50, there may be three suction mechanisms 100. In this case, there are three arms for moving the suction mechanisms 100 in the horizontal direction.

An operation example of this case is illustrated in FIG. 51. In this case, as indicated by T-shaped symbols in the thick black frame on the right side of FIG. 51, only three arms are operated. Therefore, the number of components is reduced and the overall weight can be reduced, the maximum rotational angle of the arm is within 180° so that electric wirings and pipes can be easily connected to the arm, the suction mechanism is not holding anything when the arm is rotated in the reverse direction and thus high-speed rotation is possible, and the thin optical disk does 21 not move between drive trays so that the drive trays can be drawn out by a short length.

Furthermore, in the above embodiment, there are two drive units; however, the present invention is not so limited. For example, as illustrated in FIG. 52, there may be three drive units (DU1, DU2, and DU3). In this case, the arrangement center angles are 72°. Furthermore, there may be five suction mechanisms 100. In this case, there are five arms for moving the suction mechanisms 100 in the horizontal direction. Assuming the arm center angles are 72°, the same effects as described in the above embodiment can be achieved.

In the above embodiment, the drive device can perform both recording and reproducing with the thin optical disk 21; however, the present invention is not so limited, as long as the drive device can perform at least one of recording and reproducing with the thin optical disk 21.

In the above embodiment, each suction mechanism includes three suction disks; however, the number of suctions disks is not limited to three. Furthermore, suction disks used for suctioning the thin optical disk and suction disks used for suctioning the spacer may be different from each other.

For example, each suction mechanism may include three suction disks for suctioning the thin optical disk which are spaced away from the center of the suction holding member 120 by a first distance, and three suction disks for suctioning the spacer which are spaced away from the center of the suction holding member 120 by a second distance.

Furthermore, in the above embodiment, each suction mechanism uses the suction disks 130 to suction the thin optical disk 21 and the spacer 22; however, the present invention is not so limited. The suction mechanism may use any kind of member as long as the thin optical disk 21 and the spacer 22 can be held by suction and released from suction.

Furthermore, in the above embodiment, the disk laminate 20 includes ten thin optical disks 21; however, the present invention is not so limited.

Furthermore, in the above embodiment, the disk cartridge 700 includes ten disk trays 710; however, the present invention is not so limited.

Furthermore, in the above embodiment, each drive unit includes five drive devices; however, the present invention is not so limited.

Furthermore, in the above embodiment, the thin disk is a thin optical disk; however, the present invention is not so limited. For example, the thin disk may be a thin magnetic disk.

As described above, with the disk convening mechanism according to an embodiment of the present invention, plural thin disks can be conveyed at high speed between a disk cartridge and plural drive devices. Furthermore, with the thin disk driving system according to an embodiment of the present invention, plural thin disks can be conveyed at high speed between a disk cartridge and plural drive devices and the system size can be reduced.

The present invention is not limited to the specific embodiments described herein, and variations and modifications may be made without departing from the scope of the present invention.

The present application is based on Japanese Priority Patent Application No. 2010-111604, filed on May 14, 2010, Japanese Priority Patent Application No. 2010-111608, filed on May 14, 2010, and Japanese Priority Patent Application No. 2010-111621, filed on May 14, 2010, the entire contents of which are hereby incorporated herein by reference.

What is claimed is:

1. A disk loading/unloading mechanism for loading and unloading a thin disk to and from a disk cartridge, the disk cartridge including a disk tray on which the thin disk is placed, the disk tray being drawn out from and put into the disk cartridge, the disk tray having an opening at a center part thereof, the disk loading/unloading mechanism comprising:
    an elevating mechanism including an elevating shaft being movable up and down through the opening so that part of a leading edge of the elevating shaft can be inserted into a center hole of the thin disk, the elevating mechanism being positioned below the opening of the disk tray when the disk tray is drawn out; and
    a disk holding mechanism including a holding member that holds the thin disk and a supporting shaft that supports the holding member, the supporting shaft being parallel to the elevating shaft, wherein a central axis of the supporting shaft and a central axis of the elevating shaft correspond to each other when the holding member is positioned above the disk tray.

2. The disk loading/unloading mechanism according to claim 1, wherein
    the leading edge of the elevating shaft and a leading edge of the supporting shaft are shaped so as to fit into each other.

3. The disk loading/unloading mechanism according to claim 2, wherein
    the leading edge of the supporting shaft has a protruding part, and
    the leading edge of the elevating shaft has a notch part into which the protruding part fits.

4. The disk loading/unloading mechanism according to claim 1, wherein
    the leading edge of the elevating shaft and a leading edge of the supporting shaft are both tapered.

5. The disk loading/unloading mechanism according to claim 1, wherein
    the supporting shaft includes
        an edge portion having an outer diameter that is slightly smaller than a diameter of the center hole of the thin disk, and
        a flared portion provided below the edge portion having a circumcircle with a diameter that is larger than the diameter of the center hole of the thin disk.

6. The disk loading/unloading mechanism according to claim 1, wherein
    a plurality of the thin disks are laminated and stored on the disk tray.

7. A disk conveying device for conveying a thin disk between a disk cartridge and a drive device, the disk conveying device comprising:
    the disk loading/unloading mechanism according to claim 1; and
    an arm mechanism for moving, in a horizontal direction, the supporting shaft of the disk holding mechanism in the disk loading/unloading mechanism, between the disk cartridge and the drive device.

* * * * *